US012691686B2

(12) United States Patent
Ishimi et al.

(10) Patent No.: US 12,691,686 B2

(45) Date of Patent: Jul. 28, 2026

(54) INK JET RECORDING METHOD AND INK JET RECORDING APPARATUS

(71) Applicant: CANON KABUSHIKI KAISHA, Tokyo (JP)

(72) Inventors: Keita Ishimi, Kanagawa (JP); Toshimitsu Danzuka, Tokyo (JP); Rie Takekoshi, Kanagawa (JP); Akihiro Tomida, Kanagawa (JP); Akiko Aichi, Tokyo (JP); Hiroto Kango, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 100 days.

(21) Appl. No.: 18/816,796

(22) Filed: Aug. 27, 2024

(65) Prior Publication Data

US 2025/0074061 A1 Mar. 6, 2025

(30) Foreign Application Priority Data

Aug. 30, 2023 (JP) ................................ 2023-139409
Aug. 7, 2024 (JP) ................................ 2024-130994

(51) Int. Cl.

| | |
|---|---|
| ***C09D 11/033*** | (2014.01) |
| ***B41J 2/165*** | (2006.01) |
| ***B41M 3/00*** | (2006.01) |
| ***C09D 9/04*** | (2006.01) |

(Continued)

(52) U.S. Cl.

CPC .......... *B41J 2/16508* (2013.01); *B41M 3/001* (2013.01); *C09D 9/04* (2013.01); *C09D 11/033* (2013.01); *C09D 11/30* (2013.01); *C09D 11/54* (2013.01)

(58) Field of Classification Search

CPC .... B41J 2/2107; B41J 2/16508; B41M 3/001; C09D 9/04; C09D 11/033; C09D 11/30; C09D 11/54

See application file for complete search history.

(56) References Cited

U.S. PATENT DOCUMENTS

2005/0018023 A1* 1/2005 Momose ................ B41J 2/1707 347/95
2017/0267879 A1* 9/2017 Kohzuki .............. C09D 11/107

(Continued)

FOREIGN PATENT DOCUMENTS

JP 2010184429 A 8/2010
JP 2018144300 A 9/2018

*Primary Examiner* — Jason S Uhlenhake

(74) *Attorney, Agent, or Firm* — Canon U.S.A., Inc. IP Division

(57) ABSTRACT

An ink jet recording method for recording an image on a recording medium by ejecting an aqueous ink from a print head of an ink jet recording apparatus includes applying an aqueous ink onto a recording medium, and cleaning a liquid contact member coming into contact with the aqueous ink in the ink jet recording apparatus with an aqueous cleaning liquid. The cleaning liquid contains a surfactant, a first water-soluble organic solvent with a lower vapor pressure than water, a second water-soluble organic solvent with an SP value, measured by a Fedors method, of 9.8 or more to 14.2 or less, and a third water-soluble organic solvent with a water retention capacity of 50% or less in an amount by mass of 0.7 or more relative to the total amount by mass of the water-soluble organic solvents. The cleaning liquid has a pH of 8.5 or more.

14 Claims, 4 Drawing Sheets

(51) Int. Cl.
*C09D 11/30* (2014.01)
*C09D 11/54* (2014.01)

(56) References Cited

U.S. PATENT DOCUMENTS

2019/0329553 A1* 10/2019 Suzuki ................. C11D 3/3707
2022/0111654 A1* 4/2022 Nagano .................... C11D 3/43

* cited by examiner

INK JET RECORDING METHOD AND INK JET RECORDING APPARATUS

BACKGROUND OF THE INVENTION

Field of the Invention

The present invention relates to an ink jet recording method and an ink jet recording apparatus.

Description of the Related Art

Ink jet recording methods have recently been increasingly used in printing posters, large-sized advertisements, and the like in the field called sign-and-display. One of the features of this field is that the ink jet recording apparatus can print larger areas than that for home use. Also, the images are required to be eye-catching, and accordingly, desirable inks are those that can exhibit high color quality and enable recording of images whose coloring layers have high strength and fastness.

An ink jet recording method is known to satisfy those demands, in which an ink containing a resin particulate is heated for fixation after being applied. However, using the aqueous ink containing a resin particulate can cause the ink to solidify and stick to portions in the ink jet recording apparatus that the ink comes into contact with (hereinafter referred to as liquid contact members).

In general, the use of a water-soluble organic solvent with low vapor pressure, such as glycerin, reduces the evaporation of the liquid component of the aqueous ink and thus can reduce the likelihood that the aqueous ink solidifies and sticks to liquid contact members. The aqueous ink containing a resin particulate enables the recording of high-fastness images but is likely to solidify and stick to liquid contact members even though a water-soluble organic solvent with low vapor pressure is used. If an aqueous ink solidifies and sticks to, for example, the vicinity of ejection openings of a print head, ejection properties are degraded. Also, if the aqueous ink solidifies and sticks to a unit including recovery members (including the cap and the absorber) (the unit is also referred to as the recovery unit) at the surface having ejection openings of the print head, the deposited stuck matter comes into contact with the recording medium after a while, causing, for example, soiled images.

To address such a problem, cleaning those members with a cleaning liquid is known. Japanese Patent Laid-Open No. 2010-184429 discloses an ink containing a resin particulate and a water-soluble organic solvent with high vapor pressure, such as tripropylene glycol monomethyl ether, and an ink jet recording method using a maintenance liquid. Also, Japanese Patent Laid-Open No. 2018-144300 discloses an ink containing a urethane resin particulate and a water-soluble organic solvent with high vapor pressure, such as 1,2-propanediol, and an ink jet recording method using a cleaning liquid.

The present inventors examined the properties of the aqueous inks and the ink jet recording methods using the cleaning liquids, disclosed in the above-cited patent documents. As a result, it was found that the aqueous inks remain at a portion and solidify and stick to the portion despite using the cleaning liquid and that normal ejection conditions are not recovered even by cleaning. Thus, the above-cited inks and ink jet methods are inferior in recovery from solid sticking in some cases.

SUMMARY OF THE INVENTION

Accordingly, the present invention provides an ink jet recording method that reduces the likelihood that the aqueous ink solidifies and sticks to liquid contact members and achieves excellent recovery from solid sticking. Also, the present invention provides an ink jet recording apparatus used in this ink jet recording method.

According to an aspect of the present invention, an ink jet recording method is provided for recording an image on a recording medium by ejecting an aqueous ink from a print head of an ink jet recording apparatus. The method includes applying the aqueous ink onto a recording medium, and cleaning a liquid contact member that comes into contact with the aqueous ink in the ink jet recording apparatus with an aqueous cleaning liquid. The ink jet recording apparatus includes a cleaning liquid supply path through which the cleaning liquid is supplied to the liquid contact member. The aqueous ink contains a pigment and a resin particulate. The cleaning liquid contains a surfactant, a first water-soluble organic solvent with a lower vapor pressure than water, a second water-soluble organic solvent with an SP value, measured by a Fedors method, of 9.8 or more to 14.2 or less, and a third water-soluble organic solvent with a water retention capacity of 50% or less. The amount by mass of the third water-soluble organic solvent in the cleaning liquid is 0.7 or more relative to the total amount by mass of the water-soluble organic solvents, and the cleaning liquid has a pH of 8.5 or more.

The water retention capacity is determined by allowing 10.0 g of 20% by mass aqueous liquid of the third water-soluble organic solvent placed in a laboratory dish to stand in an environment at a temperature of 30° C. and a relative humidity of 10%, measuring the mass of the residue in the laboratory dish when the mass no longer varies, and calculating the following equation (i):

$$\text{Water retention capacity (\%)} = (\text{mass of the residue in the laboratory dish (g)} - 2.0\ \text{(g)})/2.0\ \text{(g)} \quad \text{(i)}$$

Further features of the present invention will become apparent from the following description of exemplary embodiments with reference to the attached drawings.

DESCRIPTION OF THE EMBODIMENTS

Figure 1:
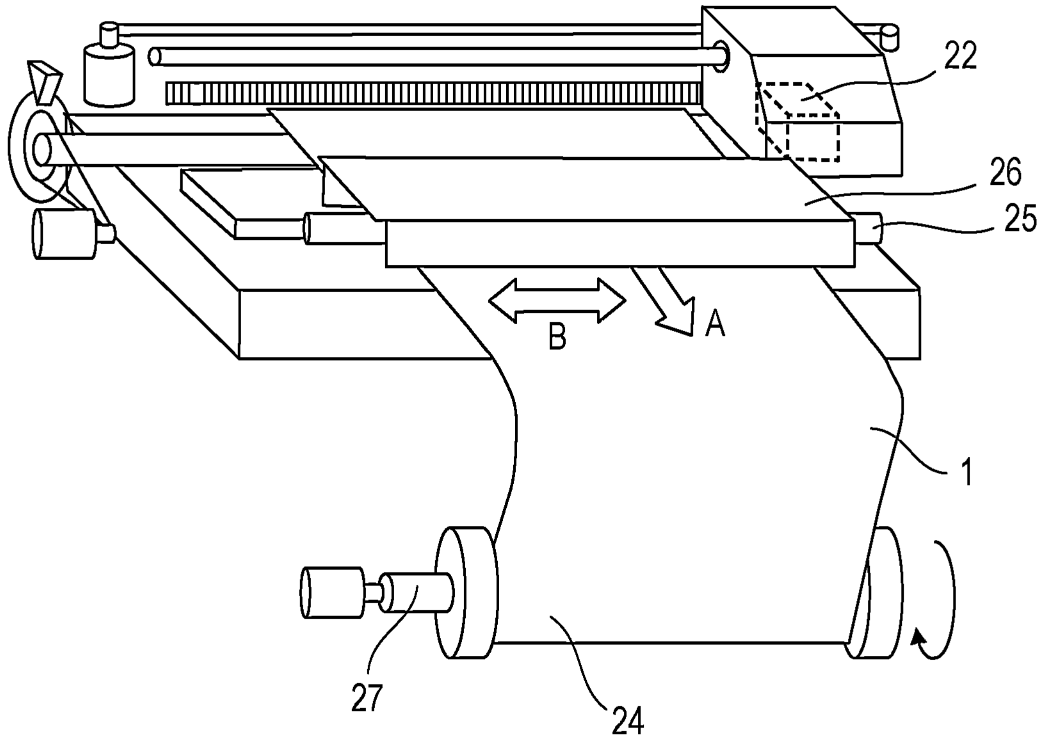
FIG. 1 is a schematic perspective view of an ink jet recording apparatus according to an embodiment of the present invention.

The present invention will be further described in detail with reference to exemplary embodiments. When a compound is a salt, the salt dissociates into ions in ink. In the following description, however, the ink is described as "containing the salt" for convenience in writing. The aqueous ink and reaction liquid used for the ink jet method may also be referred to simply as "ink" and "reaction liquid". Physical properties mentioned herein are those at room temperature (25° C.), normal pressure (1 atm=101.325 kPa) and normal humidity (50% relative humidity) unless otherwise specified.

The present inventors examined the cause of ink's solidifying and sticking to liquid contact members that come into contact with the ink in the ink jet recording apparatus. First, the members of the recovery unit that ink comes into contact with during the cleaning operation (recovery operation) or the like of the print head will be described. The members of the recovery unit include a cap that covers the surface having ejection openings (hereinafter also referred to as the ejection opening surface) of the print head, an absorber provided within the cap, and an ink drain path. Once the print head is subjected to a cleaning operation, the ink and the cleaning liquid attach to those components. Then, the water in such attached matter evaporates, increasing the viscosity. At this time, the water-soluble organic solvent with lower vapor pressure is difficult to evaporate, and thus, the viscosity of the attached matter increases further. Consequently, ejection conditions are not recovered to the normal state even by a recovery operation for the print head.

The use of an ink containing a water-soluble organic solvent with high vapor pressure, as disclosed in Japanese Patent Laid-Open Nos. 2010-184429 and 2018-144300, reduces the increase in viscosity but causes the water-soluble organic solvent to remain easily in the pigment layer formed from the ink applied onto the recording medium. Consequently, high-fastness images cannot, unfortunately, be obtained. In other words, it has not been achieved both to maintain the fastness of images and to improve recovery from solid sticking.

Inks used in the sign-and-display field may be used not only on "absorbent recording media" that can absorb ink, but also on poorly absorbent recording media that are less absorbent of ink or on non-absorbent recording media that do not absorb ink. Accordingly, many of the inks used in this field contain a water-soluble organic solvent with a higher vapor pressure than water. Water-soluble organic solvents with a higher vapor pressure than water tend to increase viscosity. In addition, in inks containing a water-soluble organic solvent with a low relative dielectric constant, the concentration of the water-soluble organic solvent increases as water evaporates, and the dispersion of the pigment and resin particulate, which are dispersed in the ink, becomes unstable. These factors combine to create a situation in which high-viscosity, hard-to-remover stuck matter is likely to occur in the recovery unit. If stuck matter then occurs in the tube connected to the suction pump, negative pressure cannot be generated within the cap covering the ejection opening surface. Probably, the ejection conditions are not likely to return to the normal state even after a recovery operation.

Under such circumstances, the present inventors believe that the liquid contact members of the recovery unit must be efficiently cleaned with a cleaning liquid containing a surfactant that imparts a cleaning power, for example, for normal recovery operation for the print head. Accordingly, the inventors further examined the composition of the cleaning liquid. As a result, it was found that using a cleaning liquid containing a surfactant and specific water-soluble organic solvents in a predetermined proportion enables normal recovery operation for the print head and improves the recovery from solid sticking.

The ink jet recording method disclosed herein is implemented as follows. The ink jet recording apparatus includes a cleaning liquid supply path through which the cleaning liquid is supplied to a liquid contact member that comes into contact with the aqueous ink. The aqueous ink contains a pigment and a resin particulate. The cleaning liquid contains a surfactant, a first water-soluble organic solvent with a lower vapor pressure than water, a second water-soluble organic solvent with an SP value, measured by the Fedors method, of 9.8 or more to 14.2 or less, and a third water-soluble organic solvent with a water retention capacity of 50% or less.

The amount (% by mass) of the third water-soluble organic solvent in the cleaning liquid is 0.7 or more relative to the total amount (% by mass) of the water-soluble organic solvents. The water retention capacity will be described in detail later. Also, the pH of the cleaning liquid is 8.5 or more. The ink jet recording method includes applying the aqueous ink onto a recording medium, and cleaning a liquid contact member that comes into contact with the aqueous ink with the cleaning liquid. The present inventors suppose that the mechanism by which the above implementation enables normal recovery for the print head and improves the recovery from solid sticking is as follows.

The ink contains a pigment and a resin particulate. Such ink can form firmly stuck matter on liquid contact members if ejected over a long period. The cleaning liquid containing a second water-soluble organic solvent with an SP value, measured by the Fedors method, of 9.8 or more to 14.2 or less efficiently dissolves the stuck matter of solidified ink and eliminates the sticking to the liquid contact member to recover normal conditions. This is probably because the water-soluble organic solvent with an SP value in the above range has a high affinity for the resin particulate generally used in aqueous ink jet inks and thus can efficiently dissolve the stuck matter. When the SP value is outside the above range (less than 9.8 or more than 14.2), the water-soluble organic solvent has a low affinity to the resin particulate and is less likely to dissolve the stuck matter. Consequently, the recovery operation cannot eliminate sticking nor reach recovery from solid sticking. If the SP value is less than 9.8, the liquid contact member may corrode.

However, in some cases, the stuck matter is difficult to dissolve, and the use of the second water-soluble organic solvent cannot reach a sufficient recovery from solid sticking. The present inventors have found that adjusting the pH of the cleaning liquid to 8.5 or more enables the stuck matter to dissolve reliably and improves the recovery from solid sticking. The pH of common aqueous inks for ink jet recording is more than 7.0, and such inks are designed so that good dispersion of the pigment and resin particulate can be maintained in the alkali liquid. The higher the pH of the cleaning liquid, the easier it is to dissolve stuck matter and disperse the pigment and resin particulate again. The present inventors identified that the pH of the cleaning liquid could be 8.5 or more to establish such conditions.

The cleaning liquid contains the first water-soluble organic solvent with a lower vapor pressure than water. The first water-soluble organic solvent has a lower vapor pressure than water. Accordingly, while water evaporates from the stuck matter of the ink and cleaning liquid, for example, remaining on the liquid contact member of the recovery unit, the first water-soluble organic solvent is less likely to evaporate. Thus, a rapid increase in viscosity does not easily occur. Consequently, the cleaning liquid produces the intended cleaning effects. If the water-soluble organic solvents in the cleaning liquid all have vapor pressures similar to the water, the liquid remaining on the liquid contact member after cleaning will dry, solidify, and stick similarly to before cleaning, and recovery from solid sticking is not achieved.

However, the present inventors found a case where the above-described cleaning liquid could not reduce the likelihood that ink solidifies and stick to the liquid contact member. Ink is easy to attach to the cap protecting the print head that ejects ink, when preliminarily ejected or such. Therefore, the liquid contact members of the recovery unit, including the cap, are subjected to cleaning. The cap protecting the print head is brought into a state in contact with the ejection opening surface (capping state). The capping state suppresses the evaporation of ink from the ejection openings. After cleaning the cap, the water-soluble organic solvents of the cleaning liquid remain within the cap in the capping state. The closed space defined by the cap and the ejection opening surface has an opening that allows water to evaporate. When water evaporates, the first water-soluble organic solvent is left in a large amount within the cap.

When the ink is allowed to stand still in this state, the ink is particularly likely to solidify and stick depending on the equilibrium states among the water-soluble organic solvent in the ink in the vicinity of the ejection openings, the water-soluble organic solvent (mainly the first water-soluble organic solvent) remaining within the cap and water. More specifically, if the equilibrium shifts in the direction in which the water-soluble organic solvent within the cap absorbs moisture, the water in the ink in the vicinity of the ejection openings is absorbed, and the constituents of the ink are likely to precipitate. The present inventors have found the following. The above phenomenon is not noticeable in inks containing substances that will present therein in a dispersed state, such as a pigment and a resin particulate, because the ink behaves to diffuse toward the side of more water. However, inks containing substances that will present therein in a dissolved state, such as water-soluble resin, exhibit the above phenomenon noticeably and do not enable sufficient recovery from solid sticking. If the precipitation as above occurs, a powerful recovery operation is required, and large amounts of ink and cleaning liquid are consumed. Also, no recovery operation results in degraded image quality.

The present inventors further examined to reduce the above precipitation and found that it is useful to control the composition of the ink in terms of the water retention capacity of the water-soluble organic solvent. More specifically, a third water-soluble organic solvent with a water retention capacity, described later, of 50% or less is added to the ink. Additionally, the amount (% by mass) of the third water-soluble organic solvent in the cleaning liquid is adjusted to 0.7 or more relative to the total amount (% by mass) of the water-soluble organic solvents, thereby achieving equilibrium for water across the water-soluble organic solvents. When the proportion by mass of the third water-soluble organic solvent is less than 0.7, the equilibrium for water shifts in the direction in which the water-soluble organic solvent remaining in the cap absorbs water. Consequently, sufficient recovery from solid sticking is not reached.

In the description presented herein, the water retention capacity is determined as follows. An aqueous liquid containing 20% by mass of a water-soluble organic solvent, weighing 10.0 g, is placed in a laboratory dish and allowed to stand in an environment at a temperature of 30° C. and a relative humidity of 10% until the mass no longer varies. The mass of the residue in the laboratory dish is measured, followed by the calculation of the following equation (i):

$$\text{Water retention capacity (\%)} = (\text{mass (g) of the residue in laboratory dish} - 2.0\text{(g)})/2.0\text{(g)} \quad \text{(i)}$$

Ink Jet Recording Method and Ink Jet Recording Apparatus

The ink jet recording method disclosed herein (hereinafter also referred to simply as the recording method) is a method for recording an image by ejecting an aqueous ink from an ink jet print head of an ink jet recording apparatus through the action of thermal energy to apply the ink onto a recording medium. The ink jet recording apparatus includes a cleaning liquid supply path through which the cleaning liquid is supplied to a liquid contact member that comes into contact with the aqueous ink. The recording method includes applying an aqueous ink onto a recording medium, and cleaning a liquid contact member that comes into contact with the aqueous ink in the ink jet recording apparatus with an aqueous cleaning liquid.

The aqueous ink contains a pigment and a resin particulate. The cleaning liquid contains a surfactant, a first water-soluble organic solvent with a lower vapor pressure than water, a second water-soluble organic solvent with an SP value, measured by the Fedors method, of 9.8 or more to 14.2 or less, and a third water-soluble organic solvent with a water retention capacity of 50% or less. The amount (% by mass) of the third water-soluble organic solvent in the cleaning liquid is 0.70 or more relative to the total amount (% by mass) of the water-soluble organic solvents.

The ink jet recording apparatus disclosed herein (hereinafter also referred to simply as the recording apparatus) prints an image by ejecting an aqueous ink and a reaction liquid from an ink jet print head through the action of thermal energy to apply the ink onto a recording medium. The recording apparatus is suitable for use in the above-described recording method. The recording method disclosed herein does not require the step of irradiating the image with active energy or the like to cure the image.

The ink jet recording method and apparatus disclosed herein will now be described in detail.

FIG. 1 is a schematic perspective view of an ink jet recording apparatus according to an embodiment of the present invention.

Figure 2:
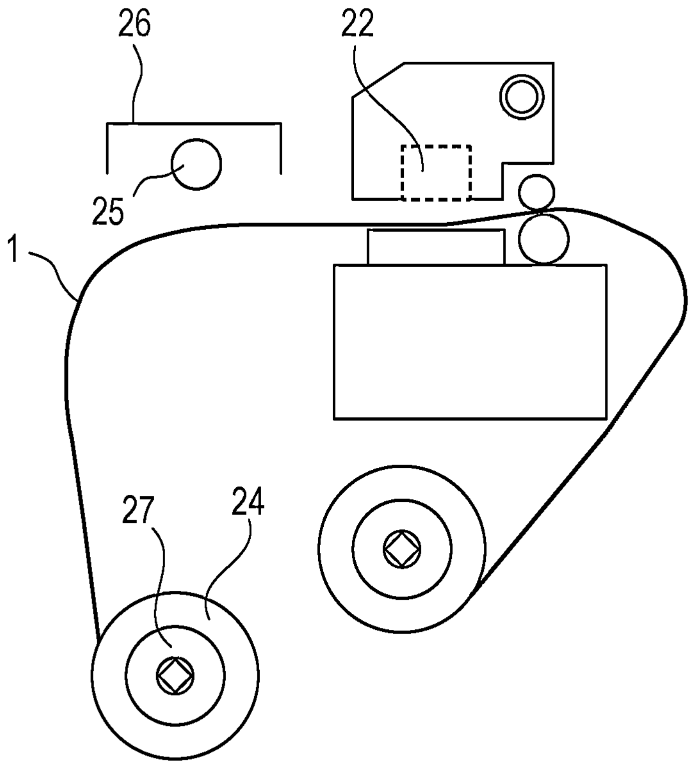
FIG. 2 is a schematic side view of an ink jet recording apparatus according to an embodiment of the present invention.

FIG. 2 is a schematic side view of an ink jet recording apparatus according to an embodiment of the present invention. The recording apparatus disclosed herein includes an ink jet print head 22 that ejects ink, as depicted in FIGS. 1 and 2. The print head 22 ejects ink through the action of thermal energy. In the print head that ejects ink through the action of thermal energy, electrical pulses are applied to electrothermal conversion elements to apply thermal energy to the ink, and thus, the ink is ejected through ejection openings. Although the print head ejects ink through the action of thermal energy in the disclosed embodiment, a print head that ejects ink through the action of mechanical energy may be used in another embodiment. The print head may include a mechanism to heat the aqueous ink to be ejected from the print head (temperature control mechanism). In an embodiment in which a temperature control mechanism is provided, the temperature of the ink ejected from the print head may be set to 35° C. or more to 70° C. or less.

Heating Step

The recording method disclosed herein may include heating (heat treating) the recording medium onto which the ink has been applied. Heating the recording medium with the ink thereon can accelerate ink drying and increase the strength of the image. Heating devices for the recording medium include heaters and other known heating devices, hear dryers and other air-blowing devices using airflow, and combinations of these devices. Heating devices include the above-mentioned heating devices, air-blowing devices, and combinations of these devices. For heating, a heater or the like may apply heat to the recording medium from the opposite side (rear side) of the recording medium to the printed side (ink application side), warm or hot air may be applied to the printed side of the recording medium, or an infrared heater may heat the recording medium from the printed side or the rear side, for example. These ways may be combined.

In some embodiments, the recording medium to which the ink and a reaction liquid have been applied is heated to 50° C. or more to 90° C. or less, at which the rub fastness of the image can be enhanced. The heating temperature of the recording medium with the ink applied thereon may be measured with a sensor at the position in the recording apparatus corresponding to the heating device or determined from the relationship between the temperature of the recording medium and the heat value previously determined according to the types of ink and recording medium.

In the recording apparatus depicted in FIGS. 1 and 2, a heater 25 supported by a frame (not depicted) is located downstream in the sub-scanning direction A from the position where the print head 22 reciprocally moves in the main scanning direction B. The heater 25 heats a recording medium 1 with an ink applied thereon. The heater 25 may be a sheath heater, a halogen heater, or the like. The heater 25 is covered with a heater cover 26. The heater cover 26 is a member that helps efficiently irradiate the recording medium 1 with heat from the heater 25. Also, the heater cover 26 protects the heater 25. The recording medium 1 with an ink applied from the print head 22 is wound up by a take-up spool 27 to form a roll of taken-up medium 24.

The main functions and components of the ink jet recording apparatus depicted in FIGS. 1 and 2 will now be described: (1) cleaning liquid delivering method, (2) cleaning liquid, (3) recovery mechanism to which the cleaning liquid is supplied, and (4) ink supply mechanism to which the cleaning liquid is supplied.

Cleaning Liquid Supply Method

The cleaning liquid may be used to clean ink-liquid contact members, such as the print head recovery mechanism and the ink supply path. Also, the cleaning liquid may be used to clean the entire liquid supply system by passing the cleaning liquid from the liquid container to the print head at a predetermined timing (for use again after long-term no-use) in the same manner as passing the ink or reaction liquid.

Figure 3:
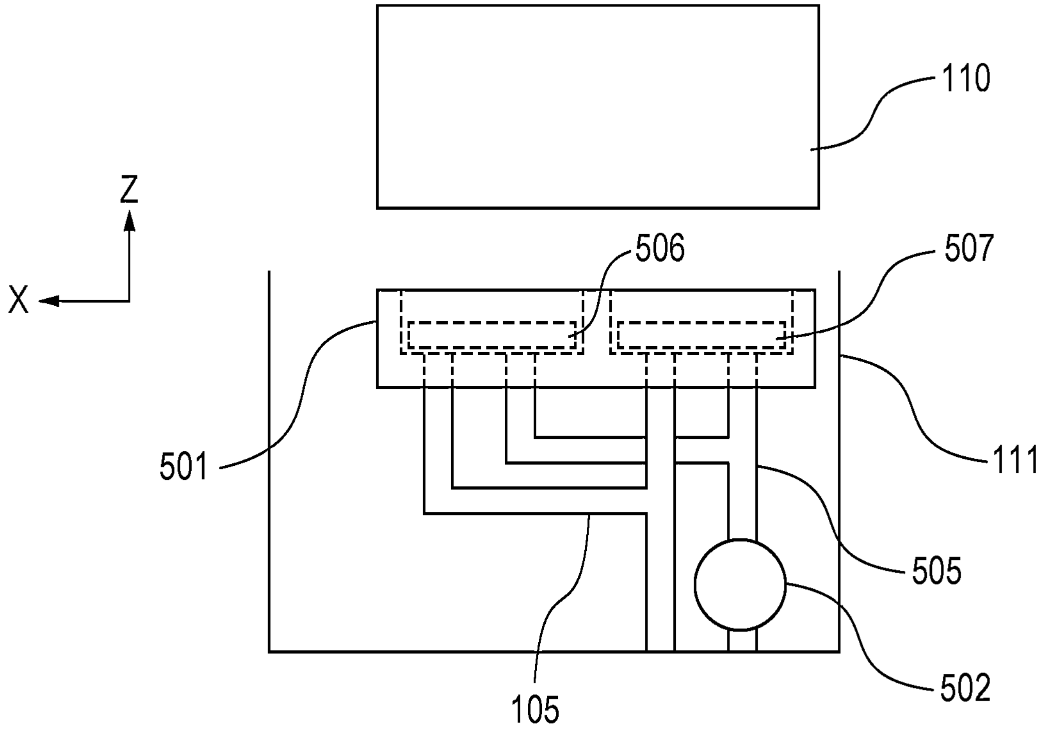
FIG. 3 is a schematic view of a recovery unit of an ink jet recording apparatus according to an embodiment of the present invention.

The cleaning liquid supply method will be described with reference to FIG. 3. FIG. 3 is a schematic view of a recovery unit used in an embodiment. The recovery unit 111 includes a cap 501 that is supported by a lifting mechanism (not depicted) to be raised and lowered and move between a raised position and a lowered position. The cap 501 comes into contact with the print head 110 at the raised position to cover (cap) the ejection opening surface of the print head 110. The cap 501 covering the ejection opening surface of the print head 110 reduces the likelihood that the ink evaporates from the ejection opening surface of the print head 110 and dries during no recording operation and also sucks the ink from the print head when a suction pump 502, described later, is driven.

The cap 501 is connected to tubes 105 and 505. The tube 105 is connected to a cleaning liquid container (not depicted) provided within or outside the ink jet recording apparatus to clean the cap 501 and the print head 110. The cleaning liquid is supplied into the cap 501 through the tube 105 by a pressurizing unit (not depicted) to dilute the ink remaining in the cap 501 to reduce the likelihood of solid sticking. The cleaning liquid is supplied at least after preliminary ejection or suction and, in an embodiment, may be supplied at regular intervals to maintain a wet condition. The tube 505 is connected to a drainage container (not depicted), and the ink and cleaning liquid held in the cap 501 are drained through the tube using a suction pump 502. The tube 105 also functions as an air communication port, that is, as an opening. The cap 501 is provided with absorbers 506 and 507 therein. The absorbers can hold a certain amount of ink that is preliminarily ejected or drained by suction recovery or a certain amount of cleaning liquid supplied from the cleaning liquid container.

For the recording operation, the cap 501 retreats to the lowered position to avoid interfering with the print head 110 that moves with the carriage 102. With the cap 501 retreated to the lowered position, the print head 110 can preliminarily eject ink into the cap 501 when the head moves to the position opposing the cap 501.

The supply of the cleaning liquid to the tube 105 can be performed by operating the suction pump 502 to generate a negative pressure in the closed space defined by the print head 110 and the cap 501 in contact with the head. However, the cleaning liquid supply method is not limited to the above. For example, the cleaning liquid may be supplied by pressurization using a pump connected to an external cleaning liquid container.

Liquid Contact Member Coming into Contact with Ink

The liquid contact members that come into contact with the ink in the ink jet recording apparatus include those in the recovery mechanism and ink supply mechanism. Specific examples of the liquid contact members in the recovery mechanism include the cap 501, the drain tube 505 in the suction mechanism, and the absorbers 506 and 507 within the cap 501. These liquid contact members can be cleaned by delivering the cleaning liquid into the cap 501 through the cleaning liquid supply tube 105 and then draining the cleaning liquid with the suction pump 502. Such a cleaning operation may be performed multiple times as needed.

Figure 4:
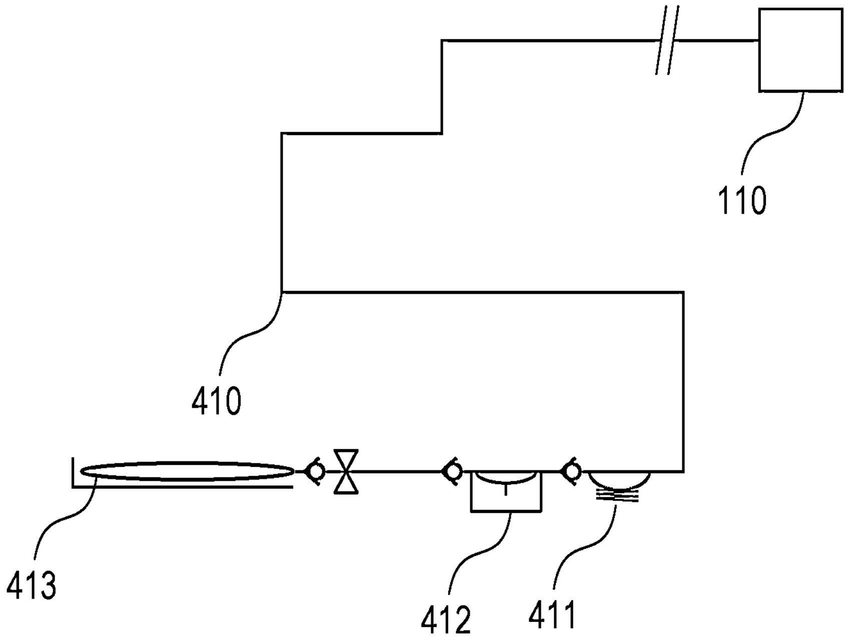
FIG. 4 is a schematic diagram of a configuration for ink supply in an embodiment.

FIG. 4 is a schematic diagram of a configuration for ink supply. A pressure pump 412 pressurizes a supply path 410, and thus, the ink is supplied to the print head 110 from an ink container 413. For transporting the ink jet recording apparatus, the ink in the supply path 410 is, in general, drained to prevent ink leakage. However, when an ink containing a water-soluble organic solvent with a higher vapor pressure than water is used, the ink remaining in the supply path 410 may dry and solidify easily and finally stick, depending on the conditions of transportation after the ink is drained. Therefore, the supply path is, desirably, cleaned by delivering the cleaning liquid to the supply path. The ink tends to remain easily particularly in portions with complex path geometries, such as a buffer unit 411 and the pressure pump 412. Accordingly, multiple cleaning times are desirable.

Cleaning can be performed in the same manner as ink supply with the ink container 413 replaced with a cleaning liquid container. For example, an ink supply tube may be connected to a container apart from the ink container without limitation to the above method.

Recording Medium

In some embodiments of the recording method and recording apparatus disclosed herein, poorly absorbent or non-absorbent recording media (hereinafter referred to as poor-to-non-absorbent recording media) are used. Poor-to-non-absorbent recording media are recording media exhibiting a water absorption of 0 $mL/m^2$ or more to 10 $mL/m^2$ or less for a period of 30 $ms^{1/2}$ from the beginning of contact with water, when measured by the Bristow method. The Bristow method is specified in Standard No. 51, "Paper and Paperboard-Liquid Absorption Test Method" (translation from Japanese) of JAPAN TAPPI Paper and Pulp Test Methods. In the present invention, the recording media satisfying the aforementioned water absorption are defined as "poor-to-non-absorbent recording media". Recording media for ink jet recording (glossy paper, matte paper, etc.) having a coating layer made from an inorganic particulate (ink-receiving layer) and plain paper having no coating layer are "absorbent recording media" exhibiting a water absorption of more than 10 $mL/m^2$ when measured as above.

Poor-to-non-absorbent recording media that can be used include plastic films, recording media with a plastic film bonded to the recording side of the substrate, and recording media provided with a resin coating layer on the recording side of the substrate containing cellulose pulp. In some embodiments, plastic films or recording media provided with a resin coating layer on the recording side of the substrate containing cellulose pulp are used.

When the ink containing a resin particulate is applied onto a poor-to-non-absorbent recording medium, water and water-soluble organic solvent evaporate, and the resin particulate is concentrated. In the concentrated resin particulate, fusion among its particles is promoted, thereby enhancing the strength of the printed image. In contrast, when such ink is applied to recording media with high liquid absorbency, fusion among the resin particles is not easily promoted, and the image strength is not enhanced. A recording medium used herein refers to that on which an image is printed, not a transfer medium.

Cleaning Liquid

The cleaning liquid used in the recording method disclosed herein is aqueous and contains a surfactant and specific water-soluble organic solvents. The constituents and the like used in the cleaning liquid will now be described in detail.

Surfactant

The cleaning liquid contains a surfactant. A surfactant is a substance including a hydrophobic portion (e.g., hydrocarbon chain, perfluoroalkyl group, siloxane structure, etc.) and a hydrophilic portion (e.g., ethylene oxide group, ionic group, etc.) Various surfactants can be used, including anionic, cationic, amphoteric and nonionic surfactants. In some embodiments, a nonionic surfactant may be used. Examples of the nonionic surfactant include hydrocarbon-based surfactants, silicone surfactants and fluorosurfactants. In some embodiments, a hydrocarbon-based surfactant may be used.

From the viewpoint of imparting excellent detergency and improving the recovery from solid sticking, the cleaning liquid may contain a relatively large amount of surfactant. The surfactant content (% by mass) of the cleaning liquid may be 0.1% by mass or more to 5.0% by mass or less, for example, 1.0% by mass or more to 5.0% by mass or less, relative to the total mass of the cleaning liquid.

The surfactant content (% by mass) of the cleaning liquid may be at least 2.0 times the critical micelle concentration of the surfactant. In general, surfactants are used to reduce the surface tension of liquids to improve the wettability (wettability) on objects. In aqueous ink jet pigment inks, the surfactant content is often larger than the amount of surfactant (critical micelle concentration) at which the decrease in surface tension saturates. The present inventors found through their study that a surfactant content of the cleaning liquid larger than the critical micelle concentration considerably increases the cleaning power with the surface tension maintained at a certain level. The critical micelle concentration refers to the minimum concentration required for surfactant molecules to come together in water to form micelles. The critical micelle concentration of a surfactant can be obtained simply by measuring the surface tension of a liquid whose surfactant content is changed stepwise and determining the amount when further addition of the surfactant results in no change in surface tension as the minimum amount of the surfactant.

From the viewpoint of further improving the recovery from solid sticking with excellent detergency, a hydrocarbon-based nonionic surfactant with an HLB value, measured by the Griffin method, of 17 or less may be used. The "HLB value" of a surfactant, mentioned herein, is measured by the Griffin method and calculated by the equation: HLB=20×(formula weight of the hydrophilic portion of the surfactant)/(molecular weight of the surfactant). An HLB value obtained by the Griffin method is a physical property representing the hydrophilicity or lipophilicity of a surfactant and lies from 0 to 20. The smaller the HLB value, the higher the lipophilicity; the larger the HLB value, the higher the hydrophilicity. The HLB value of the surfactant may be 4 or more, for example, 10 or more.

Water-Soluble Organic Solvent

The cleaning liquid contains a first water-soluble organic solvent with a lower vapor pressure than water, a second water-soluble organic solvent with an SP value, measured by the Fedors method, of 9.8 or more to 14.2 or less, and a third water-soluble organic solvent with a water retention capacity of 50% or less. The amount (% by mass) of the third water-soluble organic solvent in the cleaning liquid is 0.7 or more relative to the total amount (% by mass) of the water-soluble organic solvents. In the description presented herein, the definition of each water-soluble organic solvent is not exclusive, and a water-soluble organic solvent may satisfy two or more definitions. Even in such a case, the mechanism described above can work effectively without any loss and produce the effects of the concept disclosed herein. Each of the water-soluble organic solvents will now be described in detail.

First Water-Soluble Organic Solvent

The cleaning liquid contains a first water-soluble organic solvent with a lower vapor pressure than water. The vapor pressures of many water-soluble organic solvents are listed in literature such as "Chemical Handbook, basic edition, Rev. 5" (translation from Japanese), edited by the Chemical Society of Japan, published by Maruzen Corporation. For those not listed, the values obtained by calculation software (for example, model name "ACD/PhysChem Suite Version 12.00", manufactured by ACD/Labs) can be used. The first water-soluble organic solvent tends to remain on liquid contact members after cleaning, as described above. The major phenomenon that occurs on the liquid contact members at the beginning after cleaning is the evaporation of water contained in the ink and the cleaning liquid. The evaporation speed gradually slows down, and the water-soluble organic solvents and solids (pigment and resin particulate) attach to the liquid contact members. If the water-soluble organic solvents in the cleaning liquid have similar vapor pressures to water, the major constituents of the attached matter become solids, such as the resin particulate, in this process and dry and solidify into stuck matter. If dried and solidified, the ink containing a large amount of resin particulate is not easily dissolved, and the ejection conditions are not returned to the normal state even by recovery operation.

Even in the case in which the attached matter mainly contains the first water-soluble organic solvent and the solids in the ink, but when the second water-soluble organic solvent doubles as the first water-soluble organic solvent, the remaining second water-soluble organic solvent may hinder the redispersion of the pigment and resin particulate. Consequently, the solubility of the stuck matter may decrease to some extent. To facilitate the redispersion of the pigment and resin particulate, the relative dielectric constant of the first water-soluble organic solvent is desirably 20.0 or more. Examples of water-soluble organic solvents with a relative dielectric constant of 20.0 or more at 25° C. and a lower vapor pressure than water include triethylene glycol (22.7), 2-pyrrolidone (28.0), 1-(2-hydroxyethyl)-2-pyrrolidone (37.6) and glycerin (42.3). The numbers in parentheses are the measured relative dielectric constants at 25° C.

The relative dielectric constant of the first water-soluble organic solvent can be measured at a frequency of 10 kHz with a dielectric constant meter (e.g., model name "BI-870", manufactured by Brookhaven Instruments Corporation). When the cleaning liquid contains a plurality of first water-soluble organic solvents, their relative dielectric constants are averaged. The average relative dielectric constant used herein is the sum of the products of the relative dielectric constant of each first water-soluble organic solvent multiplied by the percentage (% by mass) of the first water-soluble organic solvent to the total mass of the first water-soluble organic solvents in the cleaning liquid. For example, the average relative dielectric constant of a cleaning liquid containing 10.0% by mass of 1,2-butanediol (22.2) and 5.0% by mass of 1,2-propanediol (28.8) is calculated as follows, wherein the numbers in the parentheses are relative dielectric constants at 25° C.:

$$\text{Average relative dielectric constant} = 22.2\times 10.0/15.0 + 28.8\times 5.0/15.0 = 24.4$$

For water-soluble organic solvents that are solid at 25° C., the relative dielectric constant is calculated by measuring 50% by mass aqueous liquid of the water-soluble organic solvent and calculating the following equation (1). While water-soluble organic solvents are typically liquid, the water-soluble organic solvents mentioned herein include those that are solid at 25° C.

$$\varepsilon_{sol} = 2\varepsilon_{50\%} - \varepsilon_{water} \tag{1}$$

$\varepsilon_{sol}$: relative dielectric constant of a water-soluble organic solvent that is solid at 25° C.

$\varepsilon_{50\%}$: relative dielectric constant of 50% by mass aqueous liquid of the water-soluble organic solvent that is solid at 25° C.

$\varepsilon_{water}$: relative dielectric constant of water

Examples of water-soluble organic solvents that are generally used in aqueous inks and cleaning liquids and are solid at 25° C. include 1,6-hexanediol, trimethylolpropane, ethyleneurea, urea and polyethylene glycol with an average molecular weight of 1,000. The reason for determining the relative dielectric constant of a water-soluble organic solvent that is solid at 25° C. from the relative dielectric constant of 50% by mass aqueous liquid of the solvent is as follows. Some of the water-soluble organic solvents that are solid at 25° C. and can be a constituent of aqueous ink are difficult to prepare as aqueous liquids with a high concentration exceeding 50% by mass. However, in an aqueous liquid with a concentration as low as 10% by mass or less, the relative dielectric constant of water is dominant, and a reliable (effective) value of the relative dielectric constant of the water-soluble organic solvent cannot be obtained. The present inventors found through their examinations that most of the water-soluble organic solvents that are solid at 25° C. and can be used in inks or cleaning liquids can be prepared as aqueous liquids to be measured and that the relative dielectric constants of the liquids are consistent with the effects of the concept disclosed herein. For this reason, 50% by mass aqueous liquids are used. For water-soluble organic solvents that are solid at 25° C. but cannot be prepared as 50% by mass aqueous liquid due to low solubility in water, their saturated aqueous liquids are used, and the relative dielectric constant calculated in the same manner as in the determination of the above $\varepsilon_{sol}$ is used for convenience.

The first water-soluble organic solvent content (% by mass) of the cleaning liquid may be 5.0% by mass or more to 50.0% by mass or less, for example, 20.0% by mass or more to 40.0% by mass or less, relative to the total mass of the cleaning liquid. Although the second water-soluble organic solvent, described later, may double as the first water-soluble organic solvent, the amount (% by mass) of the second water-soluble organic solvent satisfying the first water-soluble organic solvent is desirably 10.0% by mass or less relative to the total mass of the cleaning liquid. This is because such a second water-soluble organic solvent may hinder the redispersion of the pigment and resin particulate in the ink and make the stuck matter difficult to dissolve.

Second Water-Soluble Organic Solvent

The cleaning liquid contains a second water-soluble organic solvent with an SP value, measured by the Fedors method, of 9.8 or more to 14.2 or less. The SP value (δ) is determined by the Fedors method using the equation presented below. The SP value is also called the "solubility parameter". The smaller the difference in SP value between a solute and a solvent, the higher the affinity of the solute to the solvent tends to be. Thus, SP values can be used as a measure of the magnitude of the interaction between two substances. The second water-soluble organic solvent with an SP value within the above range exhibits sufficient affinity with the resin particulate in the ink. The unit of an SP value (δ) is $(cal/cm^3)^{1/2}$ but is omitted in the description presented herein.

$$\delta = \left(\Delta E_{vap}/V\right)^{1/2}$$

wherein $\Delta E_{vap}$ represents the molar heat of vaporization (cal/mol), and V represents the molar volume (cc/mol) at 25° C.

Examples of water-soluble organic solvents with an SP value of 9.8 or more to 14.2 or less, that is, second water-soluble organic solvents, include 1,5-pentanediol (14.2), methanol (13.8), triethylene glycol (13.6), 1,6-hexanediol (13.5), 3-methyl-1,5-pentanediol (13.4), 2-methylpentane-2,4-diol (13.1), tetraethylene glycol (12.8), polyethylene glycol with a number average molecular weight of 200 (12.8), 1,2-butanediol (12.8), 2-pyrrolidone (12.6), ethanol (12.6), 1,2-pentanediol (12.2), ethylene glycol monomethyl ether (12.0), n-propanol (11.8), 1,2-hexanediol (11.8), 2-methyl-2-hydroxypentan-4-one (11.7), isopropanol (11.6), N-methyl-2-pyrrolidone (11.5), ethylene glycol monoethyl ether (11.5), 1,3-dimethyl-2-imidazolidinone (11.4), n-butanol (11.3), diethylene glycol monomethyl ether (11.2), 2-butanol (11.1), diethylene glycol monoethyl ether (10.9), tert-butanol (10.9), triethylene glycol monoethyl ether (10.6), polyethylene glycol with a number average molecular weight of 600 (10.5), diethylene glycol monobutyl ether (10.5), 3-methoxy-3-methylbutanol (10.5), triethylene glycol monobutyl ether (10.3), tetraethylene glycol monobutyl ether (10.2) and polyethylene glycol with a number average molecular weight of 1,000 (10.1), wherein the values in parentheses are SP values.

The second water-soluble organic solvent may be at least one selected from the group consisting of monohydric alcohols, dihydric alcohols and glycol ethers. In some embodiments, the second water-soluble organic solvent is at least one selected from the group consisting of monohydric alcohols and dihydric alcohols. The alkyl group of the monohydric and dihydric alcohols may be linear or branched and substituted with an alkoxy group with 1 to 3 carbon atoms. Examples of monohydric alcohols include methanol (13.8), ethanol (12.6), n-propanol (11.8), isopropanol (11.6), n-butanol (11.3), 2-butanol (11.1), tert-butanol (10.9) and 3-methoxy-3-methylbutanol (10.5). Examples of dihydric alcohols include 1,5-pentanediol (14.2), 1,6-hexanediol (13.5), 3-methyl-1,5-pentanediol (13.4), 2-methylpentane-2,4-diol (13.1), 1,2-butanediol (12.8), 1,2-pentanediol (12.2) and 1,2-hexanediol (11.8).

In some embodiments, the second water-soluble organic solvent may be 1,2-butanediol, 1,2-pentanediol, or 1,2-hexanediol, particularly 1,2-hexanediol. These water-soluble organic solvents are likely to increase the wettability of the cleaning liquid and can further improve the detergency.

The second water-soluble organic solvent content (% by mass) of the cleaning liquid may be 10.0% by mass or more relative to the total mass of the cleaning liquid. When the second water-soluble organic solvent content is less than 10.0% by mass, the cleaning liquid cannot sufficiently penetrate the interface between the stuck matter and the liquid contact member and does not reach sufficient recovery from solid sticking. The second water-soluble organic solvent content (% by mass) of the cleaning liquid may be 35.0% by mass or less. When a resin-dispersed pigment is used, an excessive amount of second water-soluble organic solvent may act on the resin dispersant used to disperse the resin-dispersed pigment and make the dispersion slightly unstable, hindering sufficient recovery from solid sticking. Those with an SP value of 9.8 or more to 12.2 or less of the second water-soluble organic solvents are also categorized as fourth water-soluble organic solvents. The amount (% by mass) of fourth water-soluble organic solvents, if used, in the cleaning liquid may be 10.0% by mass or less relative to the total mass of the cleaning liquid and particularly 5.0% by mass or less. The fourth water-soluble organic solvent content of the cleaning liquid may be 0.0% by mass. In other words, the cleaning liquid does not need to substantially contain fourth water-soluble organic solvents.

Third Water-Soluble Organic Solvent

The above-described precipitation is a phenomenon accompanying drying. When the ejection opening surface of the print head is covered with a cap, precipitation does not easily occur in the vicinity of the ejection openings and at the ejection opening surface. However, if the recording apparatus is stored over a long period without use, the ejection opening surface dries gradually even though it is capped, and precipitation occurs at the ejection opening surface and hinders the close contact between the print head and the cap. As a result, negative pressure cannot be generated within the cap in the suction operation, which should be performed with the print head in close contact with the cap, and the recovery from solid sticking may be degraded.

The cleaning liquid contains a third water-soluble organic solvent with a water retention capacity of 50% or less. The amount (% by mass) of the third water-soluble organic solvent is 0.7 or more relative to the total amount (% by mass) of the water-soluble organic solvents in the cleaning liquid. In some embodiments, this proportion may be 0.9 or more and particularly 1.0. In other words, in some embodiments, all the water-soluble organic solvents in the cleaning liquid may belong to the third water-soluble organic solvent with a water retention capacity of 50% or less, and the cleaning liquid does not substantially contain water-soluble organic solvents with a water retention capacity of more than 50%. When the proportion by mass of the third water-soluble organic solvent is in the aforementioned range, the equilibrium for water can be established across the water-soluble organic solvents. The water retention capacity of the third water-soluble organic solvent may be 30% or more. When it is in such a range, fluctuations of the equilibrium for water can be reduced, and solidification and sticking after cleaning can be efficiently reduced.

The third water-soluble organic solvent can be those with a water retention capacity of 50% or less of the above-presented first and second water-soluble organic solvents. Of course, a third water-soluble organic solvent not satisfying the definitions of the first and second water-soluble organic solvents, that is, a third water-soluble organic solvent that is not a first or second water-soluble organic solvent may be used. The cleaning liquid may contain other water-soluble organic solvents that do not satisfy any of the definitions of the first, second and third water-soluble organic solvents to the extent that the effects of the concept disclosed herein can be produced.

In some embodiments, the water-soluble organic solvent contained in the largest amount of the water-soluble organic solvents in the aqueous ink has a higher vapor pressure (kPa) than the water-soluble organic solvents contained in the largest mass in the cleaning liquid. In this instance, even though a mixture of the aqueous ink and the cleaning liquid remains on the liquid contact member, solidification and sticking can be reduced, and the recovery from solid sticking can be improved because the water-soluble organic solvent of the cleaning liquid, being the major constituent of the mixture has a low vapor pressure. The cleaning liquid may contain a water-soluble organic solvent whose amount is 10.0% by mass or more. Even when the cleaning liquid contains a plurality of water-soluble organic solvents, the major water-soluble organic solvent in the mixture of the ink and the cleaning liquid, remaining on the liquid contact member after cleaning can be a water-soluble organic solvent derived from the cleaning liquid by controlling the amount of the most major constituent in the cleaning liquid to 10.0% by mass or more. Consequently, the recovery from solid sticking is further improved.

Other Constituents

The cleaning liquid may optionally contain other constituents. Other constituents can be the same as the substances presented later as other components that can be contained in the ink. In the present invention, such additives are not considered water-soluble organic solvents nor subject to the calculations of the SP value, vapor pressure and water retention capacity. In some embodiments, the cleaning liquid does not contain a reaction agent that is contained in the reaction liquid.

Physical Properties of Cleaning Liquid

The surface tension of the cleaning liquid at 25° C. may be 65 mN/m or less, for example, 40 mN/m or less. The cleaning liquid with a surface tension of more than 65 mN/m may be less likely to penetrate the interface between the stuck matter and the liquid contact member and does not achieve sufficient recovery from solid sticking. The surface tension at 25° C. of the cleaning liquid may be 20 mN/m or more. The surface tension of the cleaning liquid is "static" and can be measured by a plate method. Also, the pH of the cleaning liquid is 8.5 or more at 25° C. In some embodiments, it is 9.0 or more and 9.5 or less. The pH of the cleaning liquid can be measured with a pH meter or the like using a glass electrode. The viscosity of the cleaning liquid may be 15.0 mPa·s or less, for example, 5.0 mPa·s or less. Also, the viscosity may be 1.0 mPa·s or more. The cleaning liquid with a viscosity in such a range can easily penetrate the interface between the stuck matter and the liquid contact member, thus exhibiting improved detergency. The viscosity of the cleaning liquid can be measured with a rotational viscometer or the like.

Ink

The ink used in the recording method disclosed herein is an aqueous ink jet ink containing a pigment and a resin particulate. The constituents and the like used in the ink will now be described in detail.

Coloring Material

The ink contains a pigment. The pigment content (% by mass) of the ink may be 0.5% by mass or more to 15.0% by mass or less, for example, 1.0% by mass or more to 10.0% by mass or less, relative to the total mass of the ink.

Examples of the pigment include inorganic pigments, such as carbon black and titanium oxide; and organic pigments, such as azo, phthalocyanine, quinacridone, isoindolinone, imidazolone, diketopyrrolopyrrole and dioxazine.

As a dispersion of pigment, a resin-dispersed pigment may be used in which pigment is dispersed using a resin as a dispersant, or a self-dispersible pigment may be used in which a hydrophilic group is bound to the surface of pigment particles. Also, the pigment may be a resin-bound pigment in which an organic group of a resin is chemically bound to the surface of the pigment particles or a microencapsulated pigment in which the surface of the pigment particles is coated with a resin or the like. In some embodiments, a resin-dispersed pigment in which the resin as the dispersant is physically adsorbed to the surface of the pigment particles may be used rather than a resin-bound pigment or microencapsulated pigment.

The resin dispersant for dispersing the pigment in an aqueous medium may be a resin that can disperse the pigment in an aqueous medium by the action of an anionic group. The resin dispersant can be a resin as described later, particularly a water-soluble resin. The amount (% by mass) of pigment in the ink may be 0.3 or more to 10.0 or less relative to the amount (% by mass) of resin dispersant in the ink.

The self-dispersible pigment may be such that anionic groups, such as carboxy groups, sulfo groups or phosphonic acid groups, are bound to the surface of the pigment particles directly or indirectly with an atomic group (—R—) therebetween. The anionic group may be in an acid form or a salt form. If the anionic group is in a salt form, a portion or the entirety of the salt may be dissociated. The counter ion, or cation, of the anionic group in the salt form may be an alkali metal ion, ammonium ion, or an organic ammonium ion. Examples of other atomic groups (—R—) include linear or branched alkylene groups with 1 to 12 carbon atoms, arylene groups such as a phenylene group and a naphthylene group, an amide group, a sulfonyl group, an amide group, a sulfonyl group, an ester group and an ether group. Such groups may be combined to form anther group.

Resin

The ink contains a resin particulate. The resin particulate in the ink can enhance the fastness of the printed image, including the resistance to rubbing. The resin particulate may be made of an acrylic resin. The ink may further contain a water-soluble resin soluble in aqueous media. The water-soluble resin may be added to the ink (i) to stabilize the dispersion of the pigment, that is, as a resin dispersant or its assistant and (ii) to improve properties of the printed image.

The resin content of the ink may be 0.1% by mass or more to 20.0% by mass or less, for example, 0.5% by mass or more to 15.0% by mass or less, relative to the total mass of the ink. The resin may be a block copolymer, a random copolymer, a graft copolymer or a combination of these copolymers. The resin may be an individual resin or a combination of two or more resins.

Resin Materials

The resin may be acrylic resin, urethane resin or olefin resin. In some embodiments, acrylic or urethane resin is used, particularly an acrylic resin formed with a unit derived from (meth)acrylic acid or (meth)acrylates. "(Meth)acrylic acid" and "(meth)acrylate" used herein refer to "acrylic acid or methacrylic acid" and "acrylate or methacrylate", respectively.

From the viewpoint of affinity with the second water-soluble organic solvent, the SP value measured by the Fedors method of the resin particulate is desirably close to that of the second water-soluble organic solvent. In some embodiments, the SP value of the resin particulate is 8 or more to 16 or less, for example, 10 or more to 14 or less.

The acrylic resin may have a hydrophilic unit and a hydrophobic unit as the structural units. In an embodiment, a resin having a hydrophilic unit derived from (meth)acrylic acid and a hydrophobic unit derived from at least one selected from the group consisting of monomers containing aromatic rings and (meth)acrylic ester-based monomers may be used. In some embodiments, a resin having a hydrophilic unit derived from (meth)acrylic acid and a hydrophobic unit derived from at least one monomer selected from styrene and α-methylstyrene is used. Such resins are likely to interact with the pigment and, accordingly, can be used as resin dispersants to disperse the pigment.

The hydrophilic unit contains a hydrophilic group, such as an anionic group. The hydrophilic unit can be formed, for example, by polymerizing a hydrophilic monomer having a hydrophilic group. Examples of the hydrophilic monomer having a hydrophilic group include acid monomers having a carboxy group, such as (meth)acrylic acid, itaconic acid, maleic acid and fumaric acid, and anionic monomers, such as anhydrides or salts of those acid monomers. Examples of the counter cation of the salts of the acid monomers include lithium ion, sodium ion, potassium ion, ammonium ion and organic ammonium ion. The hydrophobic unit does not have anionic groups or other hydrophilic groups. The hydrophobic unit can be formed by polymerizing, for example, a hydrophobic monomer having no anionic or other hydrophobic groups. Examples of the hydrophobic monomer include monomers having an aromatic ring, such as styrene, α-methylstyrene and benzyl (meth)acrylate; and (meth) acrylic ester monomers, such as methyl (meth)acrylate, butyl (meth)acrylate and 2-ethylhexyl (meth)acrylate.

The urethane resin can be produced by a reaction of, for example, polyisocyanate and polyol. The reaction may further use a chain-extending agent. The olefin resin may be, for example, polyethylene or polypropylene.

Properties of Resin

The phrase "a resin is water-soluble" used herein implies that when the resin is neutralized with an amount of alkali equivalent to the acid value of the resin, the resin exists in an aqueous medium in a state where particles do not form with a particle size measurable by dynamic light scattering. Whether or not a resin is water-soluble can be determined by the following method. First, a liquid containing the resin (solid resin content: 10% by mass) neutralized with an amount of alkali (e.g., sodium hydroxide or potassium hydroxide) equivalent to the acid value is prepared. Then, the liquid is diluted 10 times (by volume) with pure water to prepare a sample liquid.

When no particle with detectable particle size is detected by measuring the particle size of the resin in the sample liquid using dynamic light scattering, the resin is considered to be water-soluble. At this time, the measurement conditions may be, for example, SetZero: 30 s, number of times of measurements: 3, and measuring time: 180 s. A dynamic light scattering particle size analyzer (for example, model name UPA-EX150, manufactured by Nikkiso Co., Ltd.) may be used as the particle size distribution analyzer.

However, the particle size distribution analyzer, the measuring conditions and the like are, of course, not limited to those mentioned or described above.

The acid value of the water-soluble resin may be 100 mg KOH/g or more to 250 mg KOH/g or less. The weight average molecular weight of the water-soluble resin may be 3,000 or more to 15,000 or less.

The acid value of the resin that forming the resin particulate may be 5 mg KOH/g or more to 100 mg KOH/g or less. The weight average molecular weight of the resin that forms the resin particulate may be 1,000 or more to 3,000,000 or less, for example, 100,000 or more to 3,000,000 or less. The particle size (D50) at 50% in the cumulative volume distribution of the resin particulate measured by dynamic light scattering may be 50 nm or more to 500 nm or less. The particle size at 50% in the cumulative distribution of the resin particulate refers to the particle size of resin particles at a point in the cumulative particle size curve at which the cumulative volume calculated from the smallest particle in ascending order reaches 50% of the total volume of the particles subjected to measurement. The particle size at 50% in the cumulative volume distribution of the resin particulate can be determined under the following conditions with a particle size distribution analyzer by the above-mentioned dynamic light scattering. The glass transition temperature of the resin particulate may be 40° C. or more to 120° C. or less, for example, 50° C. or more to 100° C. or less. The glass transition temperature (° C.) of the resin particulate can be measured with a differential scanning calorimeter (DSC). The particulate resin does not need to encapsulate the coloring material therein.

Aqueous Medium

The ink is an aqueous ink containing water as an aqueous medium. The ink may contain water or an aqueous medium that is a mixture of water and a water-soluble organic solvent. The water may be deionized water or ion exchange water. The water content (% by mass) of the aqueous ink may be 50.0% by mass or more to 95.0% by mass or less relative to the total mass of the ink. The water-soluble organic solvent content (% by mass) of the aqueous ink may be 3.0% by mass or more to 50.0% by mass or less relative to the total mass of the ink. Any of the water-soluble organic solvents that can be used in ink jet inks may be used, including alcohols, (poly)alkylene glycols, glycol ethers, nitrogen-containing solvents and sulfur-containing solvents. In some embodiments, the ink contains a water-soluble organic solvent with a higher vapor pressure than water. Also, the ink may contain a water-soluble organic solvent with a lower vapor pressure than water. The water-soluble organic solvent may be an individual one or a combination of two or more water-soluble organic solvents.

Other Constituents

The ink may contain other constituents as needed. Examples of other constituents include an antifoaming agent, a surfactant, a pH adjuster, a viscosity modifier, a rust preventive, a preservative, a fungicide, an antioxidant, an antireductant and other additives. However, the ink should not contain any reaction agent to be added to the reaction liquid. In the present invention, such additives are not considered water-soluble organic solvents nor subject to the calculations of the SP value, vapor pressure and water retention capacity.

Physical Properties of Ink

The ink is an aqueous ink for the ink jet method. It is, therefore, desirable to control the physical properties of the ink appropriately in view of reliability. Specifically, the surface tension of the ink at 25° C. may be 20 mN/m or more to 60 mN/m or less. Also, the viscosity of the ink at 25° C. may be 1.0 mPa·s or more to 10.0 mPa·s or less. The pH of the ink at 25° C. may be 7.0 or more to 9.5 or less, for example, 8.0 or more to 9.5 or less.

Reaction Liquid

The recording method disclosed herein may include applying an aqueous reaction liquid that reacts with the aqueous ink onto the recording medium. In some embodiments, the reaction liquid is applied before or simultaneously with the operation of applying the ink onto the recording medium. The constituents and the like used in the reaction liquid will now be described in detail.

The reaction liquid reacts with the ink when contacting the ink and aggregates the constituents in the ink (anionic group-containing substances such as resin, surfactant and self-dispersible pigment). The reaction liquid contains a reaction agent. The reaction agent destabilizes the presence of the anionic group-containing substances in the ink when contacting the ink on the recording medium, thus helping the ink coagulate. Examples of the reaction agent include multivalent metal ions, cationic substances, such as cationic resin, and organic acids. The reaction agent may be an individual substance or a combination of two or more substances.

Examples of multivalent metal ions forming multivalent metal salts include divalent metal ions, such as $Ca^{2+}$, $Cu^{2+}$, $Ni^{2+}$, $Mg^{2+}$, $Sr^{2+}$, $Ba^{2+}$ and $Zn^{2+}$, and trivalent metal ions, such as $Fe^{3+}$, $Cr^{3+}$, $Y^{3+}$ and $Al^{3+}$. For adding a multivalent metal ion into the reaction liquid, a multivalent metal salt (or its hydrate) formed by combining a multivalent metal ion and a counter anion may be used. Examples of such an anion include inorganic anions, such as $Cl^-$, $Br^-$, $I^-$, $ClO^-$, $ClO_2^-$, $ClO_3^-$; $ClO_4^-$, $NO_2^-$, $NO_3^-$, $SO_4^{2-}$, $CO_3^{2-}$, $HCO_3^-$, $PO_4^{3-}$, $HPO_4^{2-}$ and $H_2PO_4^-$; and organic anions, such as $HCOO^-$, $(COO^-)_2$, $COOH(COO—)$, $CH_3COO^-$, $CH_3CH(OH)COO^-$, $C_2H_4(COO^-)_2$, $C_6H_5COO^-$, $C_6H_4(COO^-)_2$ and $CH_3SO_3^-$. When a multivalent metal ion is used as the reaction agent, its content of the reaction liquid in terms of the multivalent metal salt of the ion may be 1.0% by mass or more to 20.0% by mass or less relative to the total mass of the reaction liquid. If the multivalent metal salt is hydrate, the "multivalent metal salt content (% by mass)" of the reaction liquid refers to the "anhydrous multivalent metal salt content (% by mass)" excluding the water as the hydrate.

When an organic acid is contained in the reaction liquid, the reaction liquid has a buffer capacity in the acid range (less than pH 7.0, e.g., pH 2.0 or more to 5.0 or less), thereby efficiently converting the anionic group in the ink into an acid form for aggregation. Examples of such an organic acid include monocarboxylic acids, such as formic acid, acetic acid, propionic acid, butyric acid, benzoic acid, glycolic acid, lactic acid, salicylic acid, pyrrole carboxylic acid, furan carboxylic acid, picolinic acid, nicotinic acid, thiophene carboxylic acid, levulinic acid and coumaric acid, and salts thereof; dicarboxylic acids, such as oxalic acid, malonic acid, succinic acid, glutaric acid, adipic acid, maleic acid, fumaric acid, itaconic acid, sebacic acid, phthalic acid, malic acid and tartaric acid, and salts and hydrogen salts thereof; tricarboxylic acids, such as citric acid and trimellitic acid, and salts and hydrogen salts thereof; and tetracarboxylic acids, such as pyromellitic acid, and salts and hydrogen salts thereof. When an organic acid is used as the reaction agent, the organic acid content (% by mass) of the reaction liquid may be 1.0% by mass or more to 50.0% by mass or less relative to the total mass of the reaction liquid.

The cationic resin that may be used as the reaction agent may be a resin having a primary, secondary, or tertiary amine structure or a resin having a quaternary ammonium salt structure. Examples of the cationic resin include resins having a structure of vinylamine, allylamine, vinylimidazole, vinylpyridine, dimethylaminoethyl methacrylate, ethylene imine, guanidine, diallyldimethylammonium chloride or alkylamine epichlorohydrin condensate. The cationic resin may be combined with an acid compound or converted into a quaternary form to increase the solubility in the reaction liquid. When a cationic resin is used as the reaction agent, the cationic resin content (% by mass) of the reaction liquid may be 0.1% by mass or more to 10.0% by mass or less relative to the total mass of the reaction liquid.

Aqueous Medium

The reaction liquid is aqueous and contains at least water as an aqueous medium. The aqueous medium used in the reaction liquid may contain a water-soluble organic solvent, described later, that can be contained in the ink.

Other Constituents

The reaction liquid may contain other constituents as needed. Those other constituents can be the same as the substances presented above as other components that can be contained in the ink.

Physical Properties of Reaction Liquid

The reaction liquid is aqueous and is used in an ink jet method. It is, therefore, desirable to control the physical properties of the reaction liquid appropriately in view of reliability. Specifically, the surface tension of the reaction liquid at 25° C. may be 20 mN/m or more to 60 mN/m or less. Also, the viscosity of the reaction liquid at 25° C. may be 1.0 mPa·s or more to 10.0 mPa·s or less. The pH of the reaction liquid at 25° C. may be 5.0 or more to 9.5 or less, for example, 6.0 or more to 9.0 or less.

Examples

The present invention will be further described in detail with reference to the following Examples and Comparative Examples. However, the invention is not limited by the Examples unless departing from the scope and spirit of the invention. In the following description, "part(s)" and "%" expressed for constituent amounts are on a mass basis unless otherwise specified.

Physical Properties of Water-Soluble Organic Solvent

The physical properties of water-soluble organic solvents were measured as described below. The vapor pressure is a literature value or is calculated by **, and the SP value is calculated by the Fedors method. Table 1 presents physical properties of water-soluble organic solvents. The number attached to polyethylene glycol indicates the number average molecular weight.

Water Retention Capacity

The water retention capacity of water-soluble organic solvents was measured by the following method. An aqueous liquid containing 20% of water-soluble organic solvent was prepared by mixing 2.0 g of water-soluble organic solvent and 8.0 g of ion exchange water. The aqueous liquid, weighing 10.0 g, was placed in a laboratory dish and allowed to stand in an environment at a temperature of 30° C. and a relative humidity of 10%. The aqueous liquid was thus allowed to stand for 24 hours. After ensuring that no more mass change occurred, the remaining matter in the laboratory dish was weighed in the same environment, and the water retention capacity was calculated by the above equation (i). For 1,2-butanediol, 1,5-pentanediol, 2-propanol, and 3-methoxy-3-methylbutanol, the calculation could not derive water retention capacities commensurate with their molecular structure. This probably results from the evaporation of these water-soluble organic solvents. These solvents are not considered the third water-soluble organic solvent. The water retention capacity of these water-soluble organic solvents was indicated as "N/A" in Table 1.

Relative Dielectric Constant

The relative dielectric constant of water-soluble organic solvents was measured at a frequency of 10 kHz with a dielectric constant meter (model name "BI-870", manufactured by Brookhaven Instruments Corporation).

TABLE 1

Physical Properties of Water-Soluble Organic Solvents

| | Physical property | | | | Applicability to the definition of solvent category | | | |
|---|---|---|---|---|---|---|---|---|
| Water-soluble organic solvent | Vapor pressure (Pa) | SP value | Water retention capacity (%) | Relative dielectric constant | First | Second | Third | Fourth |
| Glycerin | 0.03 | 16.4 | 69 | 42.3 | Yes | No | No | No |
| Triethylene glycol | 0.18 | 13.6 | 48 | 22.7 | Yes | Yes | Yes | No |
| Triethylene glycol monobutyl ether | 0.07 | 10.5 | 120 | 9.8 | Yes | Yes | No | Yes |

TABLE 1-continued

Physical Properties of Water-Soluble Organic Solvents

| Water-soluble organic solvent | Physical property: Vapor pressure (Pa) | SP value | Water retention capacity (%) | Relative dielectric constant | Applicability to the definition of solvent category: First | Second | Third | Fourth |
|---|---|---|---|---|---|---|---|---|
| 1,2-Hexanediol | 2.60 | 11.8 | 7 | 14.8 | Yes | Yes | Yes | Yes |
| 1,2-Butanediol | 19.70 | 12.8 | N/A | 22.2 | Yes | Yes | No | No |
| 1,5-pentanediol | 0.97 | 14.2 | N/A | 27.0 | Yes | Yes | No | No |
| 2-Propanol | 5775.51 | 11.6 | N/A | 18.3 | No | Yes | No | Yes |
| 2-Pyrrolidone | 3.90 | 12.6 | 48 | 28.0 | Yes | Yes | Yes | No |
| 3-Methyl-1,5-pentanediol | 1.90 | 13.4 | 17 | 23.9 | Yes | Yes | Yes | No |
| 1-(2-hydroxyethyl)-2-pyrrolidone | 0.02 | 14.3 | 47 | 37.6 | Yes | No | Yes | No |
| 3-Methoxy-3-methylbutanol | 90.00 | 10.5 | N/A | 13.3 | Yes | Yes | No | Yes |

Preparation of Reaction Liquids

The materials (unit: %) presented in Table 2 were mixed and sufficiently stirred, and the resulting mixture was subjected to pressure filtration through a cellulose acetate filter with a pore size of 3.0 μm (manufactured by Advantec) to yield a reaction liquid. "Catiomaster PDT-2" is the trade name of an aqueous liquid of poly(2-hydroxypropyldimethylammonium chloride), containing 60.0% of the resin. "Acetylenol E100 is the trade name of a hydrocarbon-based nonionic surfactant produced by Kawaken Fine Chemicals.

TABLE 2

Composition of Reaction Liquids

| | Reaction liquid 1 | 2 | 3 |
|---|---|---|---|
| Calcium nitrate tetrahydrate | 4.3 | | |
| Succinic acid | | 3.0 | |
| Catiomaster PDT-2 | | | 1.7 |
| 1,2-Butanediol | 10.0 | 10.0 | 10.0 |
| Acetylenol E100 | 1.0 | 1.0 | 1.0 |
| Ion exchange water | 84.7 | 86.0 | 87.3 |

Preparation of Pigment Dispersion Liquids

Pigment Dispersion Liquid 1

A styrene-ethyl acrylate-acrylic acid copolymer (resin 1) with an acid value of 150 mg KOH/g and a weight average molecular weight of 8,000 was prepared. Resin 1 (20.0 parts) was neutralized with an amount by mole of potassium hydroxide equivalent to the acid value of the resin, and an appropriate amount of pure water was added to yield an aqueous liquid containing 20.0% of resin 1 (solids). A mixture of 10.0 parts of pigment (C.I. Pigment Blue 15:3), 15.0 parts of resin 1 aqueous liquid and 75.0 parts of pure water was prepared. The resulting mixture and 200 parts of zirconia beads of 0.3 mm in diameter were placed into a batch-type vertical sand mill (manufactured by Aimex) and agitated for 5 hours while being cooled with water. After coarse particles were removed by centrifugation, the mixture was subjected to pressure filtration through a cellulose acetate filter with a pore size of 3.0 μm (manufactured by Advantec) to yield pigment dispersion liquid 1 containing 10.0% of pigment and 3.0% of resin dispersant (resin 1).

Pigment Dispersion Liquid 2

Pigment dispersion liquid 2 containing 10.0% of pigment and 3.0% of resin dispersant (resin 1) was prepared in the same manner as pigment dispersion liquid 1, except that the pigment was replaced with C.I. Pigment Red 122.

Pigment Dispersion Liquid 3

Pigment dispersion liquid 3 containing 10.0% of pigment and 3.0% of resin dispersant (resin 1) was prepared in the same manner as pigment dispersion liquid 1, except that the pigment was replaced with C.I. Pigment Yellow 74.

Pigment Dispersion Liquid 4

Pigment dispersion liquid 4 containing 10.0% of pigment and 3.0% of resin dispersant (resin 1) was prepared in the same manner as pigment dispersion liquid 1, except that the pigment was replaced with carbon black.

Preparation of Resin Particulates

Resin Particulate 1

A four-neck flask equipped with a stirrer, a reflux condenser and a nitrogen inlet tube was charged with 74.0 parts of ion exchange water and 0.2 part of potassium persulfate, followed by mixing. Also, an emulsion was prepared by mixing 24.0 parts of ethyl methacrylate, 1.5 parts of methacrylic acid and 0.3 part of a reactive surfactant. The trade name "Adeka Soap ER20" (produced by ADEKA, nonionic surfactant, amount by mole of added ethylene oxide group: 20) was used as the reactive surfactant.

The emulsion prepared above was dropped into the above four-necked flask over 1 hour in a nitrogen atmosphere, and a polymerization reaction was performed for 2 hours with stirring at 80° C. After the reaction system was cooled to 25° C., an aqueous liquid containing ion exchange water and an amount by mole of potassium hydroxide equivalent to the acid value of the resin particulate was added, thus preparing a water dispersion of resin particulate 1 containing 25.0% of resin particulate (solids).

Resin Particulate 2

A four-neck flask equipped with a stirrer, a reflux condenser and a nitrogen inlet tube was charged with 81.8 parts of ion exchange water and 0.2 part of potassium persulfate, followed by mixing. Also, an emulsion was prepared by mixing 16.1 parts of ethyl methacrylate, 1.6 parts of methoxy polyethylene glycol methacrylate and 0.3 part of the above-used reactive surfactant. The trade name "Blemmer PME 1000" (produced by NOF, amount by mole of added ethylene oxide group: about 23) was used as methoxy polyethylene glycol methacrylate. The emulsion prepared above was dropped into the above four-necked flask over 1 hour in a nitrogen atmosphere, and a polymerization reaction was performed for 2 hours with stirring at 80° C. After the reaction system was cooled to 25° C., ion-exchange water was added to prepare a water dispersion of resin particulate 2, containing 25.0% of resin particulate (solids).

Preparation of Inks

The materials (unit: %) presented in Table 3 were mixed and sufficiently stirred, and the resulting mixture was subjected to pressure filtration through a cellulose acetate filter with a pore size of 3.0 μm (manufactured by Advantec), thus preparing inks. "Acetylenol E60 is the trade name of a hydrocarbon-based nonionic surfactant produced by Kawaken Fine Chemicals.

TABLE 3

Composition of Inks

| | Ink | | | | | |
|---|---|---|---|---|---|---|
| | 1 | 2 | 3 | 4 | 5 | 6 |
| Pigment dispersion liquid 1 | 20.0 | | | | 20.0 | 20.0 |
| Pigment dispersion liquid 2 | | 20.0 | | | | |
| Pigment dispersion liquid 3 | | | 20.0 | | | |
| Pigment dispersion liquid 4 | | | | 20.0 | | |
| Water dispersion of resin particulate 1 | 32.0 | 32.0 | 32.0 | 32.0 | | 32.0 |
| Water dispersion of resin particulate 2 | | | | | 32.0 | |
| 1,2-Butanediol | 20.0 | 20.0 | 20.0 | 20.0 | 20.0 | |
| 1,2-Hexanediol | | | | | | 20.0 |
| Acetylenol E60 | 0.5 | 0.5 | 0.5 | 0.5 | 0.5 | 0.5 |
| Proxel GXL (S) | 0.2 | 0.2 | 0.2 | 0.2 | 0.2 | 0.2 |
| Ion exchange water | 27.3 | 27.3 | 27.3 | 27.3 | 27.3 | 27.3 |

Preparation of Cleaning Liquids

The materials (unit: %) presented in upper rows of Tables 4 to 6 were mixed and sufficiently stirred, and the resulting mixture was subjected to pressure filtration through a cellulose acetate filter with a pore size of 3.0 μm (manufactured by Advantec), thus preparing cleaning liquids. Lower rows of Tables 4 to 6 present properties of the cleaning liquids.

The following surfactants were used in the cleaning liquids. The number in the parentheses at the end of each surfactant in Tables 4 to 6 is the HLB value measured by the Griffin method. "EO" in formulas (2) and (3) below represents the ethylene oxide group ($-CH_2-CH_2-O-$).

Trade name "Acetylenol E60", hydrocarbon-based nonionic surfactant produced by Kawaken Fine Chemicals Trade name "Acetylenol E100", hydrocarbon-based nonionic surfactant produced by Kawaken Fine Chemicals Trade name "NIKKOL BC-20", hydrocarbon-based nonionic surfactant produced by Nikko Chemicals Trade name "NIKKOL BC-30", hydrocarbon-based nonionic surfactant produced by Nikko Chemicals Trade name "NIKKOL BC-40", hydrocarbon-based nonionic surfactant produced by Nikko Chemicals Silicone surfactant (nonionic surfactant) represented by the following formula (2)

Fluorosurfactant (nonionic surfactant) represented by the following formula (3):

(2)

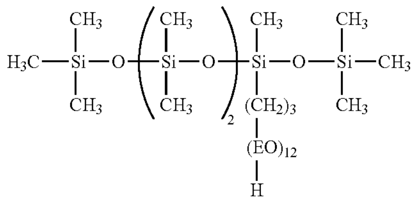

(3)

$$F-(CF_2)_5-(EO)_8-H$$

TABLE 4

Composition and Properties of Cleaning Liquids

| | Cleaning liquid | | | | | | | | |
|---|---|---|---|---|---|---|---|---|---|
| | 1 | 2 | 3 | 4 | 5 | 6 | 7 | 8 | 9 |
| Glycerin | | | | | | | | | |
| Triethylene glycol | 20.0 | 20.0 | 20.0 | | | | 14.0 | 16.0 | 17.0 |
| Triethylene glycol monobutyl ether | | | | | | | | | |
| 1,2-Hexanediol | 5.0 | 5.0 | 5.0 | 20.0 | 22.5 | | 11.0 | 9.0 | 8.0 |
| 1,2-Butanediol | | | | | | | | | |
| 1,5-Pentanediol | | | | 5.0 | 2.5 | | | | |
| 2-Propanol | | | | | | | | | |
| 2-Pyrrolidone | | | | | | | | | |
| 3-Methyl-1,5-pentanediol | | | | | | 25.0 | | | |
| 1-(2-hydroxyethyl)-2-pyrrolidone | | | | | | | | | |
| 3-Methoxy-3-methylbutanol | | | | | | | | | |
| Acetylenol E60 (11) | | | | | | | | | |
| Acetylenol E100 (13) | 2.0 | 2.0 | 2.0 | 2.0 | 2.0 | 2.0 | 2.0 | 2.0 | 2.0 |
| NIKKOL BC-20 (16) | | | | | | | | | |
| NIKKOL BC-30 (17) | | | | | | | | | |
| NIKKOL BC-40 (18) | | | | | | | | | |
| Fluorosurfactant (11) | | | | | | | | | |
| Silicone Surfactant (11) | | | | | | | | | |
| Triethanolamine | 1.0 | | | 1.0 | 1.0 | 1.0 | 1.0 | 1.0 | 1.0 |
| Potassium hydroxide | | 0.01 | 0.02 | | | | | | |
| Sodium hydrogencarbonate | | | | | | | | | |
| Ion exchange water | 72.0 | 72.99 | 72.98 | 72.0 | 72.0 | 72.0 | 72.0 | 72.0 | 72.0 |
| Surface tension (mN/m) | 29.7 | 29.7 | 29.7 | 29.7 | 29.6 | 29.6 | 29.6 | 28.6 | 28.3 |
| pH | 9.1 | 8.5 | 9.3 | 9.1 | 9.1 | 9.1 | 9.1 | 9.1 | 9.1 |
| Water-soluble organic solvent content S (%) | 25.0 | 25.0 | 25.0 | 25.0 | 25.0 | 25.0 | 25.0 | 25.0 | 25.0 |
| First water-soluble organic solvent content S1 (%) | 25.0 | 25.0 | 25.0 | 25.0 | 25.0 | 25.0 | 25.0 | 25.0 | 25.0 |
| Relative dielectric constant (Average) of first water-soluble organic solvent | 21.1 | 21.1 | 21.1 | 17.2 | 16.0 | 23.9 | 19.2 | 19.9 | 20.2 |

TABLE 4-continued

Composition and Properties of Cleaning Liquids

| | Cleaning liquid | | | | | | | | |
|---|---|---|---|---|---|---|---|---|---|
| | 1 | 2 | 3 | 4 | 5 | 6 | 7 | 8 | 9 |
| Second water-soluble organic solvent content S2 (%) | 25.0 | 25.0 | 25.0 | 25.0 | 25.0 | 25.0 | 25.0 | 25.0 | 25.0 |
| Third water-soluble organic solvent content S3 (%) | 25.0 | 25.0 | 25.0 | 20.0 | 22.5 | 25.0 | 25.0 | 25.0 | 25.0 |
| Water retention capacity (%) of third water-soluble organic solvent | 48 | 48 | 48 | 7 | 7 | 17 | 47 | 48 | 48 |
| Fourth water-soluble organic solvent content S4 (%) | 5.0 | 5.0 | 5.0 | 20.0 | 22.5 | 0.0 | 11.0 | 9.0 | 8.0 |
| Surfactant content (%) | 2.0 | 2.0 | 2.0 | 2.0 | 2.0 | 2.0 | 2.0 | 2.0 | 2.0 |
| S3/S | 1.0 | 1.0 | 1.0 | 0.8 | 0.9 | 1.0 | 1.0 | 1.0 | 1.0 |

TABLE 5

Composition and Properties of Cleaning Liquids

| | Cleaning liquid | | | | | | | | |
|---|---|---|---|---|---|---|---|---|---|
| | 10 | 11 | 12 | 13 | 14 | 15 | 16 | 17 | 18 |
| Glycerin | | | | | | | | | |
| Triethylene glycol | 9.5 | 10.0 | 20.0 | 20.0 | 20.0 | 20.0 | 20.0 | 20.0 | 20.0 |
| Triethylene glycol monobutyl ether | | | | | | | | | |
| 1,2-Hexanediol | 5.0 | 5.0 | 5.0 | 5.0 | 5.0 | 5.0 | 5.0 | 5.0 | 5.0 |
| 1,2-Butanediol | | | | | | | | | |
| 1,5-Pentanediol | | | | | | | | | |
| 2-Propanol | | | | | | | | | |
| 2-Pyrrolidone | | | | | | | | | |
| 3-Methyl-1,5-pentanediol | | | | | | | | | |
| 1-(2-hydroxyethyl)-2-pyrrolidone | | | | | | | | | |
| 3-Methoxy-3-methylbutanol | | | | | | | | | |
| Acetylenol E60 (11) | | | | | 2.0 | | | | |
| Acetylenol E100 (13) | 2.0 | 2.0 | | | | | | | 0.1 |
| NIKKOL BC-20 (16) | | | | | | 2.0 | | | |
| NIKKOL BC-30 (17) | | | | | | | 2.0 | | |
| NIKKOL BC-40 (18) | | | | | | | | 2.0 | |
| Fluorosurfactant (11) | | | 0.04 | | | | | | |
| Silicone Surfactant (11) | | | | 1.0 | | | | | |
| Triethanolamine | 1.0 | 1.0 | 1.0 | 1.0 | 1.0 | 1.0 | 1.0 | 1.0 | 1.0 |
| Potassium hydroxide | | | | | | | | | |
| Sodium hydrogencarbonate | | | | | | | | | |
| Ion exchange water | 82.5 | 82.0 | 73.96 | 73.0 | 72.0 | 72.0 | 72.0 | 72.0 | 73.9 |
| Surface tension (mN/m) | 27.2 | 27.9 | 27.8 | 28.8 | 26.1 | 31.8 | 31.8 | 31.8 | 36.9 |
| pH | 9.1 | 9.1 | 9.1 | 9.1 | 9.1 | 9.1 | 9.1 | 9.1 | 9.1 |
| Water-soluble organic solvent content S (%) | 14.5 | 15.0 | 25.0 | 25.0 | 25.0 | 25.0 | 25.0 | 25.0 | 25.0 |
| First water-soluble organic solvent content S1 (%) | 14.5 | 15.0 | 25.0 | 25.0 | 25.0 | 25.0 | 25.0 | 25.0 | 25.0 |
| Relative dielectric constant (Average) of first water-soluble organic solvent | 20.0 | 20.1 | 21.1 | 21.1 | 21.1 | 21.1 | 21.1 | 21.1 | 21.1 |
| Second water-soluble organic solvent content S2 (%) | 14.5 | 15.0 | 25.0 | 25.0 | 25.0 | 25.0 | 25.0 | 25.0 | 25.0 |
| Third water-soluble organic solvent content S3 (%) | 14.5 | 15.0 | 25.0 | 25.0 | 25.0 | 25.0 | 25.0 | 25.0 | 25.0 |
| Water retention capacity (%) of third water-soluble organic solvent | 48 | 48 | 48 | 48 | 48 | 48 | 48 | 48 | 48 |
| Fourth water-soluble organic solvent content S4 (%) | 5.0 | 5.0 | 5.0 | 5.0 | 5.0 | 5.0 | 5.0 | 5.0 | 5.0 |
| Surfactant content (%) | 2.0 | 2.0 | 0.0 | 1.0 | 2.0 | 2.0 | 2.0 | 2.0 | 0.1 |
| S3/S | 1.0 | 1.0 | 1.0 | 1.0 | 1.0 | 1.0 | 1.0 | 1.0 | 1.0 |

TABLE 6

Composition and Properties of Cleaning Liquids

| | Cleaning liquid | | | | | | | |
|---|---|---|---|---|---|---|---|---|
| | 19 | 20 | 21 | 22 | 23 | 24 | 25 | 26 |
| Glycerin | | | 25.0 | 15.0 | | | | |
| Triethylene glycol | 20.0 | 20.0 | | 10.0 | | 20.0 | | |
| Triethylene glycol monobutyl ether | | | | | | | 25.0 | |
| 1,2-Hexanediol | 5.0 | 5.0 | | | | 5.0 | | |
| 1,2-Butanediol | | | | | | | | 5.0 |
| 1,5-Pentanediol | | | | | | | | |
| 2-Propanol | | | | | 25.0 | | | |
| 2-Pyrrolidone | | | | | | | | 60.0 |
| 3-Methyl-1,5-pentanediol | | | | | | | | |
| 1-(2-hydroxyethyl)-2-pyrrolidone | | | | | | | | |
| 3-Methoxy-3-methylbutanol | | | | | | | | 15.0 |
| Acetylenol E60 (11) | | | | | | | | |
| Acetylenol E100 (13) | 0.5 | 1.0 | 2.0 | 2.0 | 2.0 | 2.0 | 2.0 | 2.0 |
| NIKKOL BC-20 (16) | | | | | | | | |
| NIKKOL BC-30 (17) | | | | | | | | |
| NIKKOL BC-40 (18) | | | | | | | | |
| Fluorosurfactant (11) | | | | | | | | |
| Silicone Surfactant (11) | | | | | | | | |
| Triethanolamine | 1.0 | 1.0 | 1.0 | 1.0 | 1.0 | | | |
| Potassium hydroxide | | | | | | | | |
| Sodium hydrogencarbonate | | | | | | | 0.04 | |
| Ion exchange water | 73.5 | 73.0 | 72.0 | 72.0 | 72.0 | 73.0 | 72.96 | 18.0 |
| Surface tension (mN/m) | 34.1 | 30.6 | 29.9 | 29.1 | 29.8 | 29.4 | 30.5 | 29.4 |
| pH | 9.1 | 9.1 | 9.1 | 9.1 | 9.1 | 7.8 | 8.3 | 8.2 |
| Water-soluble organic solvent content S (%) | 25.0 | 25.0 | 25.0 | 25.0 | 25.0 | 25.0 | 25.0 | 80.0 |
| First water-soluble organic solvent content S1 (%) | 25.0 | 25.0 | 25.0 | 25.0 | 0.0 | 25.0 | 25.0 | 65.0 |
| Relative dielectric constant (Average) of first water-soluble organic solvent | 21.1 | 21.1 | 42.3 | 34.5 | — | 21.1 | 9.8 | 27.6 |
| Second water-soluble organic solvent content S2 (%) | 25.0 | 25.0 | 0.0 | 10.0 | 25.0 | 25.0 | 25.0 | 80.0 |
| Third water-soluble organic solvent content S3 (%) | 25.0 | 25.0 | 0.0 | 10.0 | 0.0 | 25.0 | 0.0 | 60.0 |
| Water retention capacity (%) of third water-soluble organic solvent | 48 | 48 | — | 48 | — | 48 | — | 48 |
| Fourth water-soluble organic solvent content S4 (%) | 5.0 | 5.0 | 0.0 | 0.0 | 25.0 | 5.0 | 25.0 | 15.0 |
| Surfactant content (%) | 0.5 | 1.0 | 2.0 | 2.0 | 2.0 | 2.0 | 2.0 | 2.0 |
| S3/S | 1.0 | 1.0 | 0.0 | 0.4 | 0.0 | 1.0 | 0.0 | 0.8 |

Preparation of Recording Media

The following media were prepared:

Recording medium 1: Polyethylene terephthalate film (trade name "PETWH50 PAT8LK", manufacture by Lintec Corporation, water absorption for 30 $ms^{1/2}$ from the beginning of contact with water, measured by the Bristow method: 2.5 $mL/m^2$)

Recording medium 2: art paper (trade name "Art PW 8K", manufactured by Lintec Corporation, water absorption for 30 $ms^{1/2}$ from the beginning of contact with water, measured by the Bristow method: 10 $mL/m^2$)

Recording medium 3: high-quality paper (trade name "55 PW 8K COC", manufactured by Lintec Corporation, water absorption for 30 $ms^{1/2}$ from the beginning of contact with water, measured by the Bristow method: 12 $mL/m^2$).

Evaluation of Recovery from Solid Sticking

For evaluating the recovery from solid sticking, the performance of the cleaning liquids and the performance of the recovery operation were examined using the above-prepared reaction liquid, inks, and cleaning liquids. In the evaluation described herein, "AA", "A" and "B" are acceptable levels, and "C" is an unacceptable level. The results are presented in Table 7.

Performance of Cleaning Liquids (1) Dissolving Power to Stuck Matter

Each of the inks presented in Table 7, weighing 0.5 g, was placed in a glass laboratory dish with an inner diameter of 5 cm and allowed to stand for 120 hours in an environment at a temperature of 30° C. and a relative humidity of 10% for solidification. Then, 3 g of the cleaning liquid, presented in Table 7, was placed in the laboratory dish and blended with the solidified, stuck ink, followed by standing with a cover for 15 hours. Then, the integral value (x) of absorbance of the contents of the laboratory dish was measured in the wavelength range of 200 nm to 800 nm as the coloration derived from the pigment in the ink. Also, the integral value (y) of absorbance of the cleaning liquid was measured under the same conditions. For measuring the absorbance, a spectrophotometer (model "U-3011", produced by Hitachi High-Tech Science) was used. The degree of cleaning was calculated by the following equation (ii) using the resulting integral values (x) and (y), and the dissolving power to stuck matter was rated according to the following criteria. The larger the degree of cleaning, the higher the performance of the cleaning liquid in dissolving stuck mater; hence, the cleaning liquid is excellent in recovery from solid stacking.

$$\text{Degree of cleaning} = (\text{integral value } (x) \text{ of absorbance after cleaning})/(\text{integral value } (y) \text{ of absorbance of cleaning liquid}) \quad \text{(ii)}$$

AA: The degree of cleaning was 100 or more.

A: The degree of cleaning was 20 or more to less than 100.

B: The degree of cleaning was 10 or more to less than 20.

C: The degree of cleaning was less than 10.

(2) Inhibition of Viscosity Increase

The ink and the cleaning liquid were mixed in a ratio of 1:3 (volume ratio), as presented in Table 7, and the viscosity of the mixture was measured (viscosity before storage (x)). After the mixture was placed in a container and allowed to stand in an environment at a temperature of 30° C. and a relative humidity of 10% for 15 hours with the container not covered, the viscosity was measured again at the temperature returned to 25° C. (viscosity after storage (y)). The viscosity was measured with a viscometer (model name "RE80", manufactured by Toki Sangyo). The difference in viscosity before and after the storage was calculated, and the inhibition of viscosity increase was rated according to the following criteria. The smaller the difference in viscosity before and after the storage, the more the increase in viscosity is inhibited in spite of liquid evaporation. This suggests that even though liquid evaporation proceeds, the liquid is less likely to solidify and stick and that the cleaning liquid is good in detergency and recovery from solid sticking.

AA: Difference in viscosity (y−x) was 15 mPa·s or less.

A: Difference in viscosity (y−x) was more than 15 mPa·s to 50 mPa·s or less.

B: Difference in viscosity (y−x) was more than 50 mPa·s to 100 mPa·s or less.

C: Difference in viscosity (y−x) exceeded 100 mPa·s or could not be measured due to the solidification of the mixture after storage.

(3) Inhibition of Precipitation

The reaction liquid and the cleaning liquid were mixed in a ratio of 1:3 (volume ratio), as presented in Table 7, and 5 g of the mixture was placed in a glass laboratory dish with an inner diameter of 5 cm. The laboratory dish was allowed to stand in an environment at a temperature of 30° C. and a relative humidity of 10% for 120 hours without being covered, and whether or not a precipitate was formed was visually checked. If a precipitate was observed, Operation (1) of shaking the laboratory dish for 1 minutes was performed, and the presence of a residual precipitate was visually checked. If a precipitate was observed at this time, Operation (2) of adding 3 g of the reaction liquid and shaking the laboratory dish for 1 minute was performed, and the presence of a residual precipitate was visually checked. The inhibition of precipitation was rated according to the following criteria. The presence or absence of a precipitate was determined by whether the mixture was transparent or not. No precipitate suggests that the constituents are unlikely to precipitate in spite of liquid evaporation and that the stuck matter can be easily removed by the recovery operation using the cleaning liquid; hence, the cleaning liquid is excellent in recovery from solid sticking. To facilitate checking for a precipitate in the mixture, the examination was performed using the reaction liquid instead of the ink.

AA: No precipitate was observed.

A: Precipitate was observed but not after Operation (1).

B: Precipitate was observed, remaining after Operation (1), but was not observed after Operation (2).

C: Precipitate was observed and remained even after Operations (1) and (2).

Performance of Recovery Operational

The reaction liquid, the ink and the cleaning liquid presented in Table 7 were filled into a cartridge, and the cartridge was installed in an ink jet recording apparatus having the structure depicted in FIG. 1. Recording was performed at a temperature of 25° C. and a relative humidity of 50%. In the Examples disclosed herein, the recording duty of an image printed under the conditions where 4.0 ng of a droplet is applied to a unit area of 1/1,200 inch×1/1,200 inch was defined as 100%. The reaction liquid and the ink presented in Table 7 were applied to a recording medium in layers in this order, with 50% recording duty for the reaction liquid and 160% for the ink to print a solid color image of 2 cm×2 cm. The recording medium 1 described above was used for Examples 1 to 27 and Comparative Examples 1 to 6. The recording medium 2 described above was used for Example 28. The recording medium 3 described above was used for Example 29. The evaluation using the ink jet recording apparatus was performed separately on (1) the recovery unit and (2) the supply path.

Recovery Performance at Recovery Unit (1) Recovery from Solid Stacking

After recording the above solid image on 100 sheets, stuck matter was observed on the recovery unit (the absorber within the cap). The recovery unit was cleaned at most four times by a washing operation in which 1 mL of cleaning liquid was supplied from the cartridge into the cap and then sucked by the suction pump. After cleaning, the degree of recovery of the recovery unit from solid sticking was rated by visual observation according to the following criteria.

AA: Stuck matter was removed by the first cleaning.

A: Stuck matter was observed after the first cleaning but was removed by an additional cleaning.

B: Stuck matter was observed after the second cleaning but was removed by three additional cleanings.

C: Stuck matter was observed after the third cleaning and was not removed even by three additional cleanings.

(2) Suction

The flow path was closed upstream of the print head with the ejection opening surface covered with the cap, and the suction pump was driven for suction with the air release valve of the suction cap closed. The suction performance of the recovery unit was rated based on the time required for the difference between the negative pressure (x) before suction and a negative pressure (y) to come to within 5 kPa, according to the following criteria. The shorter the time to reach a predetermined negative pressure, the less the stuck matter remains on the recovery unit, suggesting that the recovery from solid sticking is excellent.

AA: The time required for the difference in negative pressure (y−x) before and after suction to come to within 5 kPa was within 1 minute.

A: The time required for the difference in negative pressure (y−x) before and after suction to come to within 5 kPa was more than 1 minute and less than 5 minutes.

B: The difference in negative pressure (y−x) before and after suction did not come to within 5 kPa even after 5 minutes of continuous suction.

C: The suction cap was not sealed by suctioning with the suction pump, and negative pressure was not generated.

Recovery Performance in Ink Supply Path (1) Recovery from Solid Stacking

The performance of the recovery from solid sticking in the ink supply path was evaluated as described below. This evaluation is under the assumption that the ink supply system is cleaned before the ink jet recording apparatus is stopped from being used, and then the ink supply system is filled again to resume use. More specifically, after recording the above solid image, the ink was drained from the ink supply system disposed from the ink container to the print head. Then, the cleaning liquid was allowed to flow through the ink supply system for cleaning, followed by draining the cleaning liquid. This operation brings the ink supply system to a state not filled with liquid. Under this condition, the recording apparatus was placed in an environment at a temperature of 60° C. and a relative humidity of 50% for 48 hours for an accelerated test under the assumption of a long period of no use. Then, 50 g of ink was supplied from the ink container to fill the flow path from the ink container to the print head ahead with ink. The flow path has a capacity that is filled with 50 g of ink. The ink-unfilled percentage (%) (=y/x×100) was calculated from 50 g of ink supplied to the ink container (amount of ink supplied x=50 (g)) and the amount of ink filled into the flow path (amount of ink consumed, y (g)), and the recovery from solid sticking was rated according to the following criteria. The smaller the ink-unfilled percentage, the less solidified, stuck ink remains in the flow path before the use is stopped, suggesting that the recovery from solid sticking is excellent.

AA: The ink-unfilled percentage was 10% or less.

A: The ink-unfilled percentage was more than 10% and 15% or less.

B: The ink-unfilled percentage was more than 15% and 30% or less.

C: The ink-unfilled percentage was more than 30%, and the ink supply was stopped halfway through.

TABLE 7

Conditions and Results of Evaluation

| | | Evaluation condition | | | | Evaluation result: Cleaning performance | | | Evaluation result: Performance of recovery operation | | |
|---|---|---|---|---|---|---|---|---|---|---|---|
| | | Reaction liquid | Ink | Cleaning liquid | Recording medium | (1) Dissolving power to stuck matter | (2) Inhibition of viscosity increase | (3) Inhibition of precip-itation | Recovery unit (1) Recovery from solid sticking | Recovery unit (2) Suction | Supply path (1) Recovery from solid sticking |
| Example | 1 | 1 | 1 | 1 | 1 | AA | AA | AA | AA | AA | AA |
| | 2 | 1 | 2 | 1 | 1 | AA | AA | AA | AA | AA | AA |
| | 3 | 1 | 3 | 1 | 1 | AA | AA | AA | AA | AA | AA |
| | 4 | 1 | 4 | 1 | 1 | AA | AA | AA | AA | AA | AA |
| | 5 | 1 | 5 | 1 | 1 | AA | AA | AA | AA | AA | AA |
| | 6 | 2 | 1 | 1 | 1 | AA | AA | AA | AA | AA | AA |
| | 7 | 3 | 1 | 1 | 1 | AA | AA | AA | AA | AA | AA |
| | 8 | 1 | 1 | 2 | 1 | A | AA | AA | AA | AA | AA |
| | 9 | 1 | 1 | 3 | 1 | AA | AA | AA | AA | AA | AA |
| | 10 | 1 | 1 | 4 | 1 | A | AA | A | B | A | B |
| | 11 | 1 | 1 | 5 | 1 | A | AA | A | B | A | A |
| | 12 | 1 | 1 | 6 | 1 | AA | A | AA | A | AA | AA |
| | 13 | 1 | 6 | 1 | 1 | AA | AA | AA | AA | AA | AA |
| | 14 | 1 | 1 | 7 | 1 | A | AA | AA | B | AA | A |
| | 15 | 1 | 1 | 8 | 1 | A | AA | AA | A | AA | A |
| | 16 | 1 | 1 | 9 | 1 | AA | AA | AA | AA | AA | AA |
| | 17 | 1 | 1 | 10 | 1 | AA | A | AA | A | AA | AA |
| | 18 | 1 | 1 | 11 | 1 | AA | A | AA | AA | AA | AA |
| | 19 | 1 | 1 | 12 | 1 | B | AA | AA | B | AA | A |
| | 20 | 1 | 1 | 13 | 1 | B | AA | AA | B | AA | A |
| | 21 | 1 | 1 | 14 | 1 | AA | AA | AA | AA | AA | AA |
| | 22 | 1 | 1 | 15 | 1 | AA | AA | AA | AA | AA | AA |
| | 23 | 1 | 1 | 16 | 1 | AA | AA | AA | AA | AA | AA |
| | 24 | 1 | 1 | 17 | 1 | AA | AA | AA | A | AA | A |
| | 25 | 1 | 1 | 18 | 1 | B | AA | AA | B | AA | B |
| | 26 | 1 | 1 | 19 | 1 | A | AA | AA | B | AA | A |
| | 27 | 1 | 1 | 20 | 1 | AA | AA | AA | AA | AA | AA |
| | 28 | 1 | 1 | 1 | 2 | AA | AA | AA | AA | AA | AA |
| | 29 | 1 | 1 | 1 | 3 | AA | AA | AA | AA | AA | AA |
| Comparative Example | 1 | 1 | 1 | 21 | 1 | AA | AA | C | AA | C | AA |
| | 2 | 1 | 1 | 22 | 1 | C | AA | C | C | C | C |
| | 3 | 1 | 1 | 23 | 1 | AA | C | C | C | C | AA |
| | 4 | 1 | 1 | 24 | 1 | C | AA | AA | C | AA | A |
| | 5 | 1 | 1 | 25 | 1 | C | AA | C | C | C | C |
| | 6 | 1 | 1 | 26 | 1 | C | AA | AA | C | AA | A |

The ink jet recording method disclosed herein can reduce the likelihood that aqueous ink solidifies and sticks to liquid contact members and exhibit excellent recovery from solid sticking even in the case of continuous recording using ink tending to solidify and stick easily. Also, an ink jet recording apparatus is used in this ink jet recording method is provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-139409, filed Aug. 30, 2023 and No. 2024-130994 filed Aug. 7, 2024, which are hereby incorporated by reference herein in their entirety.

What is claimed is:

1. An ink jet recording method for recording an image on a recording medium by ejecting an aqueous ink from a print head of an ink jet recording apparatus, the method comprising:

applying an aqueous ink onto a recording medium, the aqueous ink comprising a pigment and a resin particulate; and cleaning a liquid contact member that comes into contact with the aqueous ink in the ink jet recording apparatus with an aqueous cleaning liquid, wherein the ink jet recording apparatus includes a cleaning liquid supply path through which the cleaning liquid is supplied to the liquid contact member, wherein the cleaning liquid comprises a surfactant, a first water-soluble organic solvent with a lower vapor pressure than water, a second water-soluble organic solvent with an SP value, measured by a Fedors method, of 9.8 or more to 14.2 or less, and a third water-soluble organic solvent with a water retention capacity of 50% or less in an amount by mass of 0.7 times or more relative to the total amount by mass of the water-soluble organic solvents, and the cleaning liquid has a pH of 8.5 or more, wherein the first water-soluble organic solvent, the second water-soluble organic solvent, and the third water-soluble organic solvent are the same or different, and wherein the water retention capacity is determined by allowing 10.0 g of 20% by mass aqueous liquid of the third water-soluble organic solvent placed in a laboratory dish to stand in an environment at a temperature of 30° C. and a relative humidity of 10%, measuring the mass of the residue in the laboratory dish when the mass no longer varies, and calculating the following equation (i):

$$\text{Water retention capacity (\%)} = [\text{mass of the residue in the laboratory dish (g)} - 2.0\text{(g)}]/2.0\text{(g)}. \quad \text{(i)}$$

2. The ink jet recording method according to claim 1, wherein the water retention capacity of the third water-soluble organic solvent is 30% or more.

3. The ink jet recording method according to claim 1, wherein the amount by mass (% by mass) of the third water-soluble organic solvent in the cleaning liquid is 0.9 times or more relative to the total amount by mass (% by mass) of the water-soluble organic solvents.

4. The ink jet recording method according to claim 1, wherein the liquid contact member includes a recovery mechanism for the print head.

5. The ink jet recording method according to claim 1, wherein the liquid contact member includes a supply mechanism for the aqueous ink.

6. The ink jet recording method according to claim 1, wherein the aqueous ink comprises at least one water-soluble organic solvent, and in the aqueous ink, the water-soluble organic solvent contained in the largest amount (% by mass) of the at least one water-soluble organic solvent has a higher vapor pressure (kPa) than the water-soluble organic solvent contained in the largest amount in the cleaning liquid.

7. The ink jet recording method according to claim 1, wherein the first water-soluble organic solvent in the cleaning liquid has a relative dielectric constant of 20.0 or more.

8. The ink jet recording method according to claim 1, wherein at least one of the water-soluble organic solvents in the cleaning liquid accounts for 10.0% by mass or more of the total mass of the cleaning liquid.

9. The ink jet recording method according to claim 1, wherein the cleaning liquid comprises a fourth water-soluble organic solvent with an SP value, measured by a Fedors method, of 9.8 or more to 12.2 or less in an amount of 10.0% by mass or less relative to the total amount by mass (% by mass) of the water-soluble organic solvents.

10. The ink jet recording method according to claim 1, wherein the surfactant in the cleaning liquid is a hydrocarbon-based nonionic surfactant with an HLB value, measured by a Griffin method, of 17 or less.

11. The ink jet recording method according to claim 1, wherein the cleaning liquid has a pH of 9.0 or more.

12. The ink jet recording method according to claim 1, further comprising applying an aqueous reaction liquid that reacts with the aqueous ink onto the recording medium.

13. The ink jet recording method according to claim 1, wherein the recording medium exhibits a water absorption of 10 $mL/m^2$ or less for a period of 30 $ms^{1/2}$ from the beginning of contact with water when measured by a Bristow method.

14. An ink jet recording apparatus for recording an image on a recording medium by ejecting an aqueous ink from a print head, the apparatus comprising:

an ink application device configured to apply the aqueous ink onto a recording medium;

a cleaning device configured to clean a liquid contact member that comes into contact with the aqueous ink in the ink jet recording apparatus with an aqueous cleaning liquid; and a cleaning liquid supply path through which the cleaning liquid is supplied to the liquid contact member, wherein the aqueous ink contains a pigment and a water-soluble organic solvent with a higher vapor pressure than water, wherein the cleaning liquid comprises a surfactant, a first water-soluble organic solvent with a lower vapor pressure than water, a second water-soluble organic solvent with an SP value, measured by a Fedors method, of 9.8 or more to 14.2 or less, and a third water-soluble organic solvent with a water retention capacity of 50% or less in an amount by mass of 0.7 times or more relative to the total amount by mass of the water-soluble organic solvents, wherein the first water-soluble organic solvent, the second water-soluble organic solvent, and the third water-soluble organic solvent are the same or different, and wherein the water retention capacity is determined by allowing 10.0 g of 20% by mass aqueous liquid of the third water-soluble organic solvent placed in a laboratory dish to stand in an environment at a temperature of 30° C. and a relative humidity of 10%, measuring the mass of the residue in the laboratory dish when the mass no longer varies, and calculating the following equation (i):

$$\text{Water retention capacity (\%)} = (\text{mass (g) of the residue in the laboratory dish} - 2.0(\text{g}))/2.0(\text{g}). \quad \text{(i)}$$

* * * * *